United States Patent
Xu et al.

(10) Patent No.: US 11,704,908 B1
(45) Date of Patent: Jul. 18, 2023

(54) COMPUTER VISION ENABLED SMART SNOOZE HOME SECURITY CAMERAS

(71) Applicant: Ambarella International LP, Santa Clara, CA (US)

(72) Inventors: Ruian Xu, San Jose, CA (US); Didier LeGall, Los Altos, CA (US)

(73) Assignee: Ambarella International LP, Santa Clara, CA (US)

( * ) Notice: Subject to any disclaimer, the term of this patent is extended or adjusted under 35 U.S.C. 154(b) by 163 days.

(21) Appl. No.: 17/191,705

(22) Filed: Mar. 4, 2021

(51) Int. Cl.
*G06V 20/40* (2022.01)
*G06T 7/20* (2017.01)
*G06V 40/16* (2022.01)
*H04N 7/18* (2006.01)

(52) U.S. Cl.
CPC ............... *G06V 20/46* (2022.01); *G06T 7/20* (2013.01); *G06V 20/41* (2022.01); *G06V 40/172* (2022.01); *H04N 7/185* (2013.01); *H04N 7/188* (2013.01); *G06T 2207/10016* (2013.01); *G06T 2207/30201* (2013.01); *G06V 20/44* (2022.01)

(58) Field of Classification Search
CPC ...... G06V 20/46; G06V 40/172; G06V 20/44; G06V 40/20; G06T 7/20; G06T 2207/10016; G06T 2207/30201; H04N 7/185; H04N 7/188; G08B 21/22
See application file for complete search history.

(56) References Cited

U.S. PATENT DOCUMENTS

| | | | |
|---|---|---|---|
| 2018/0158312 A1* | 6/2018 | Tannenbaum | G07C 9/00 |
| 2018/0233010 A1* | 8/2018 | Modestine | H04N 7/181 |
| 2018/0357247 A1* | 12/2018 | Siminoff | G08B 13/19606 |
| 2022/0172700 A1* | 6/2022 | Xiong | G10L 21/028 |

OTHER PUBLICATIONS

Korshunov, Pavel, and Touradj Ebrahimi. "Towards optimal distortion-based visual privacy filters." 2014 IEEE International Conference on Image Processing (ICIP). IEEE, 2014. (Year: 2014).*
Long, Yang, et al. "Accurate object localization in remote sensing images based on convolutional neural networks." IEEE Transactions on Geoscience and Remote Sensing 55.5 (2017): 2486-2498. (Year: 2017).*
Zhang, Yingjie, et al. "The implementation of CNN-based object detector on ARM embedded platforms." 2018 IEEE 16th Intl Conf on Dependable, Autonomic and Secure Computing, 16th Intl Conf on Pervasive Intelligence and Computing. IEEE, 2018. (Year: 2018).*

* cited by examiner

*Primary Examiner* — Amandeep Saini
(74) *Attorney, Agent, or Firm* — Christopher P. Maiorana, PC

(57) ABSTRACT

An apparatus including an interface and a processor. The interface may be configured to receive pixel data. The processor may be configured to generate a plurality of video frames in response to the pixel data received from the interface, perform computer vision operations to detect objects in the video frames, extract features of the objects in response to characteristics of the objects determined using the computer vision operations, identify a person in the video frames based on the features, detect an event based on the person identified and generate a notification in response to detecting the event and a permission status. The permission status may suppress sending the notification when the permission status for the person identified corresponds to denying the notification and enable sending the notification when the permission status does not correspond to denying the notification.

19 Claims, 15 Drawing Sheets

COMPUTER VISION ENABLED SMART SNOOZE HOME SECURITY CAMERAS

FIELD OF THE INVENTION

The invention relates to computer vision generally and, more particularly, to a method and/or apparatus for implementing computer vision enabled smart snooze home security cameras.

BACKGROUND

Consumer grade home security cameras are designed to either record 24×7 or activate recording when motion is detected. Motion is often detected using a motion sensor separate from the camera sensor (i.e., a passive infrared (PIR) sensor). Consumers receive notifications when an event is detected. While consumers want notifications of events, some events trigger multiple notifications. In particular, one annoying user experience that provides no value for the consumer is when detection of the owner is constantly triggering motion-based notifications. For example, if the homeowner is working in the garage then a home security camera capturing the garage area could keep being triggered by the movements of the homeowner and repeatedly send notifications.

Conventional strategies for preventing unwanted notifications include geofencing and manual settings. Geofencing automatically turns off the home security camera when the homeowner is at home. A device such as a smartphone might be used to detect the presence of a homeowner, or time of day settings might be used to make assumptions about when the homeowner is at home. Geofencing has both practical and security limitations. Using a device to detect the homeowner requires the homeowner to always be near the device. Geofencing can be a security flaw when there are multiple cameras in a home. For safety reasons, the owner might not want outdoor cameras to be turned off. For example, if geofencing turns off all cameras, packages left on a front porch can be stolen while the owner is at home. Leaving only outdoor cameras on while the homeowner is at home can still result in unnecessary notifications (i.e., notifications when the homeowner is doing yardwork). Manual settings can be used to temporarily disable notification (i.e., snooze notification). Notifications can be disabled for a specified period of time (i.e., time of day, the next half hour, the next hour, etc.). Manual notifications are inflexible and can result in either unwanted notifications if the homeowner remains in the area after the snooze setting has expired, or leave an area unprotected (i.e., not recorded) if the homeowner leaves the area before the snooze setting expires.

It would be desirable to implement computer vision enabled smart snooze home security cameras.

SUMMARY

The invention concerns an apparatus including an interface and a processor. The interface may be configured to receive pixel data. The processor may be configured to generate a plurality of video frames in response to the pixel data received from the interface, perform computer vision operations to detect objects in the video frames, extract features of the objects in response to characteristics of the objects determined using the computer vision operations, identify a person in the video frames based on the features, detect an event based on the person identified and generate a notification in response to detecting the event and a permission status. The permission status may suppress sending the notification when the permission status for the person identified corresponds to denying the notification and enable sending the notification when the permission status does not correspond to denying the notification.

BRIEF DESCRIPTION OF THE FIGURES

Embodiments of the invention will be apparent from the following detailed description and the appended claims and drawings.

DETAILED DESCRIPTION OF THE EMBODIMENTS

Figure 1:
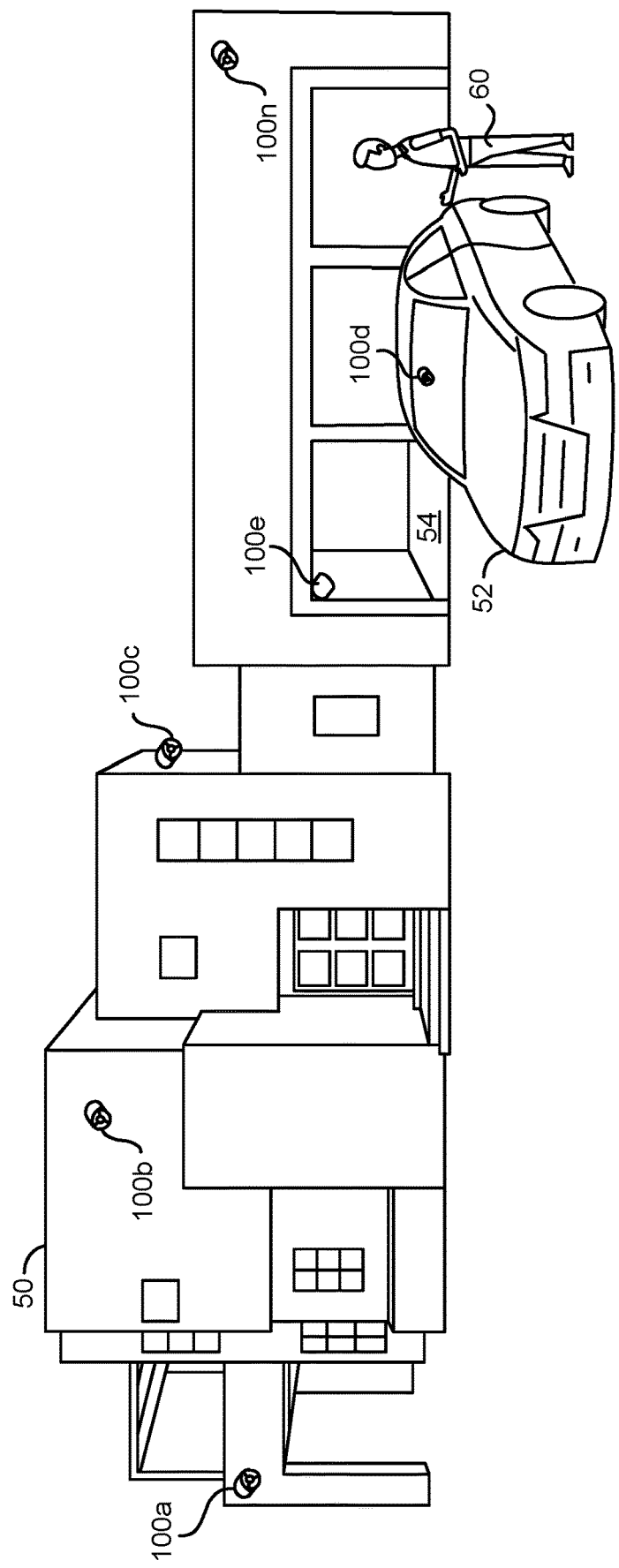
FIG. 1 is a diagram illustrating an example context of the present invention.

Embodiments of the present invention include providing computer vision enabled smart snooze home security cameras that may (i) implement an embedded device that performs computer vision operations locally, (ii) detect particular individuals, (iii) contextually suppress notifications based on computer vision operations, (iv) enable/disable notifications and/or video recording in response to people detected, (v) obscure particular individuals in captured video to protect privacy, (vi) implement audio analysis to confirm an identity of a person and/or (vii) be implemented as one or more integrated circuits.

Embodiments of the present invention may be configured to implement embedded artificial intelligence (AI) with computer vision in order to perform a smart snooze for security camera systems. The smart snooze implementation may enable automatic contextual suppression of notifications in response to detecting particular individuals. The smart snooze implementation may enable automatic contextual activation of notifications in response to particular individuals not being detected.

Embodiments of the present invention may be configured to implement various computer vision techniques. In one example, face recognition may be implemented. In another example, person recognition may be implemented. The computer vision techniques may be configured to identify whether a particular person detected is a homeowner (or other approved person such as a family member, an employee, a friend, etc.). The computer vision techniques may be configured to determine whether the particular person is present when an event happens. The event may be detected in response to the computer vision operations and/or analysis of other input received from various sensors (e.g., audio, motion, temperature, etc.).

An end-user (e.g., the homeowner or other user) may specify when a camera system may skip sending notifications when the particular person is present within the field of view of the camera. For example, when a homeowner is working in the home garage or doing lawn work in the front yard, the notifications may be temporarily suppressed. The suppression of notifications may only be applied to particular cameras that detect the particular person. Other cameras (e.g., part of a home security system) may still send notification if an event happens (e.g., an event that does not comprise detection of the particular individuals). In one example, a companion application for the camera system (e.g., a smartphone app configured to communicate with the camera system) may be implemented that provides a user interface that enables a user to configure various camera system settings.

Embodiments of the present invention may be configured to implement face recognition and/or person recognition to implement the smart snooze for notifications. In some embodiments, the smart snooze may be configured to apply to recording. For example, recording (e.g., storing locally and/or uploading to an external service such as a cloud service) may be temporarily paused in response to detecting the particular person. In some embodiments, the smart snooze may further comprise obscuring the face and/or body of the particular person detected. Obscuring the face and/or body may be implemented to protect privacy. In one example, the face and/or body may be obscured by applying a blur effect to an area of the captured video that the particular person is located. In another example, the face and/or body may be obscured by applying a mosaic effect and/or applying an alternate graphic (or filter) to the location that the particular person is located.

Embodiments of the present invention may be configured to confirm an identity of a person before the smart snooze is implemented. For example, a person may be partially visible in the captured video frame (e.g., not in the direct field of view of the camera), which may prevent face recognition. The confirmation of the identity of the person may comprise using a microphone and speaker to interrogate the person detected when motion and/or a person is determined to be present, but the recognition task may not be able to be performed successfully using analysis of video alone. For example, an audio output may be generated to ask the person to state their identity. Audio input captured in response may be analyzed to determine the response to the question. The response detected may be used to confirm the identity (e.g., voice recognition). For example, if the homeowner responds to the question and confirms the identity, then the notifications may be suppressed.

Embodiments of the present invention may implement embedded voice recognition. The voice recognition may be configured to identify the speaker as one of the homeowners (or other authorized party) when video recognition is unavailable. In response to identifying the person, the notifications may be suppressed (e.g., smart snooze notifications, smart snooze recording, apply blur effects, etc.). In some embodiments, the authorized person may similarly use a voice activated command to reactivate the camera to an active mode (e.g., re-enable notifications, recordings, stop applying blur effects, etc.). In some embodiments, the computer vision operations may detect a lack of activity and end the suppression of the notifications.

Referring to FIG. 1, a diagram illustrating an example context of the present invention is shown. A home 50, a vehicle 52, and a garage interior 54 are shown. A person 60 is shown near the vehicle 52. Camera systems 100a-100n are shown. Each of the cameras 100a-100n may be configured to generate pixel data of the environment, generate video frames from the pixel data, encode the video frames and/or generate notifications in response to objects detected in the video frames. For example, each of the cameras 100a-100n may be configured to operate independently of each other. Each of the cameras 100a-100n may capture video and generate video streams and/or generate notifications about content detected in the video streams. In one example, the respective video streams may be uploaded to a cloud storage service. In another example, the respective video streams may be stored locally (e.g., on a microSD card, to a local network attached storage device, etc.). In yet another example, the notifications may be communicated to a user device (e.g., a smartphone, a smartwatch, etc.).

Each of the cameras 100a-100n may be configured to detect different or the same events/objects that may be considered interesting. For example, the camera system 100n may capture an area near an entrance of the home 50. For an entrance of the home 50, objects/events of interest may be detecting people. The camera system 100n may be configured to analyze video frames to detect people and generate a notification in response to detecting the person 60. In another example, the camera system 100d may capture an area near the vehicle 52. For the vehicle 52, objects/events of interest may be detecting other vehicles and pedestrians. In yet another example, the camera system 100e may capture the garage interior 54. For the garage interior 54, the camera system 100e may be configured to detect people (e.g., potential intruders and/or burglars) and/or various items (e.g., determine whether tools, or vehicles have been stolen).

Each of the cameras 100a-100n may operate independently from each other. For example, each of the cameras 100a-100n may individually analyze the pixel data captured and perform the event/object detection locally (e.g., relying on embedded features implemented by each of the camera systems 100a-100n). In some embodiments, the cameras 100a-100n may be configured as a network of cameras (e.g., security cameras that send video data to a central source such as network-attached storage and/or a cloud service). The locations and/or configurations of the cameras 100a-100n may be varied according to the design criteria of a particular implementation.

Figure 2:
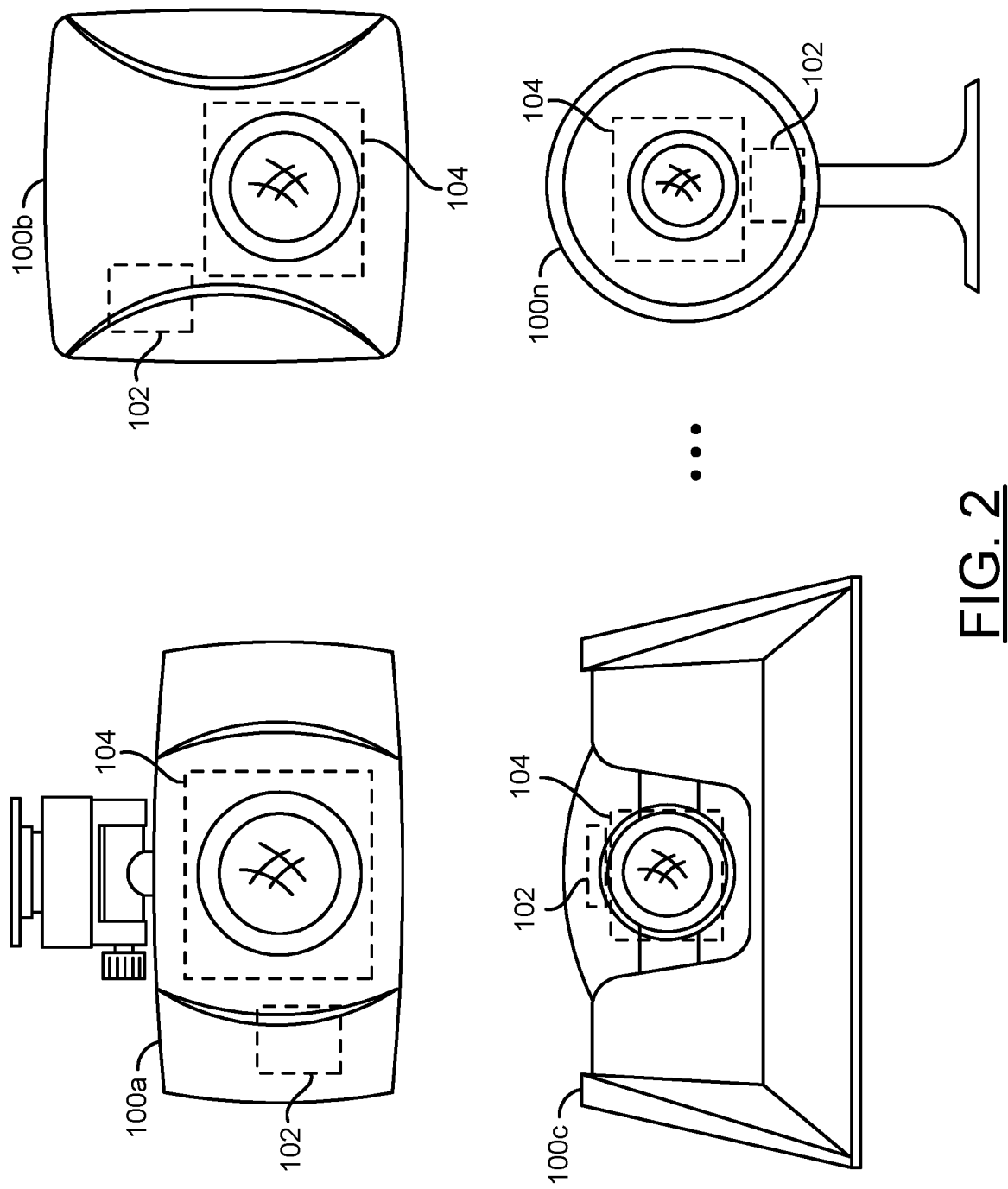
FIG. 2 is a diagram illustrating example internet-connected cameras implementing an example embodiment of the present invention.

Referring to FIG. 2, a diagram illustrating example internet-connected cameras implementing an example embodiment of the present invention is shown. Camera systems 100a-100n are shown. Each camera system 100a-100n may have a different style case and/or use. For example, the camera 100a may be an action camera, the camera 100b may be a ceiling mounted security camera, the camera 100c may be a windshield mounted vehicle camera, the camera 100n may be webcam, etc. Other types of cameras may be implemented (e.g., home security cameras, battery powered cameras, doorbell cameras, stereo cameras, etc.). The design/style of the cameras 100a-100n may be varied according to the design criteria of a particular implementation.

Each of the camera systems 100a-100n may comprise a block (or circuit) 102 and/or a block (or circuit) 104. The circuit 102 may implement a processor. The circuit 104 may implement a capture device. The camera systems 100a-100n may comprise other components (not shown). Details of the components of the cameras 100a-100n may be described in association with FIG. 3.

The processor 102 may be configured to implement one or more artificial neural networks (ANNs) configured to provide artificial intelligence and/or computer vision. In one example, one or more of the ANNs may include a convolutional neural network (CNN) and/or generative adversarial network (GAN) trained to provide image processing, object detection, object recognition, object classification, etc. The processor 102 may be configured to implement a video encoder. The processor 102 may determine whether to generate and/or suppress a notification in response to the objects detected (e.g., using the ANNs) in the captured video frames. The capture device 104 may be configured to capture pixel data that may be used by the processor 102 to generate video frames.

The cameras 100a-100n may be edge devices. The processor 102 implemented by each of the cameras 100a-100n may enable the cameras 100a-100n to implement various functionality internally (e.g., at a local level). For example, the processor 102 may be configured to perform object/event detection (e.g., computer vision operations), video encoding and/or video transcoding on-device. For example, even advanced processes such as computer vision may be performed by the processor 102 without uploading video data to a cloud service in order to offload computation-heavy functions (e.g., computer vision, video encoding, video transcoding, etc.).

Figure 3:
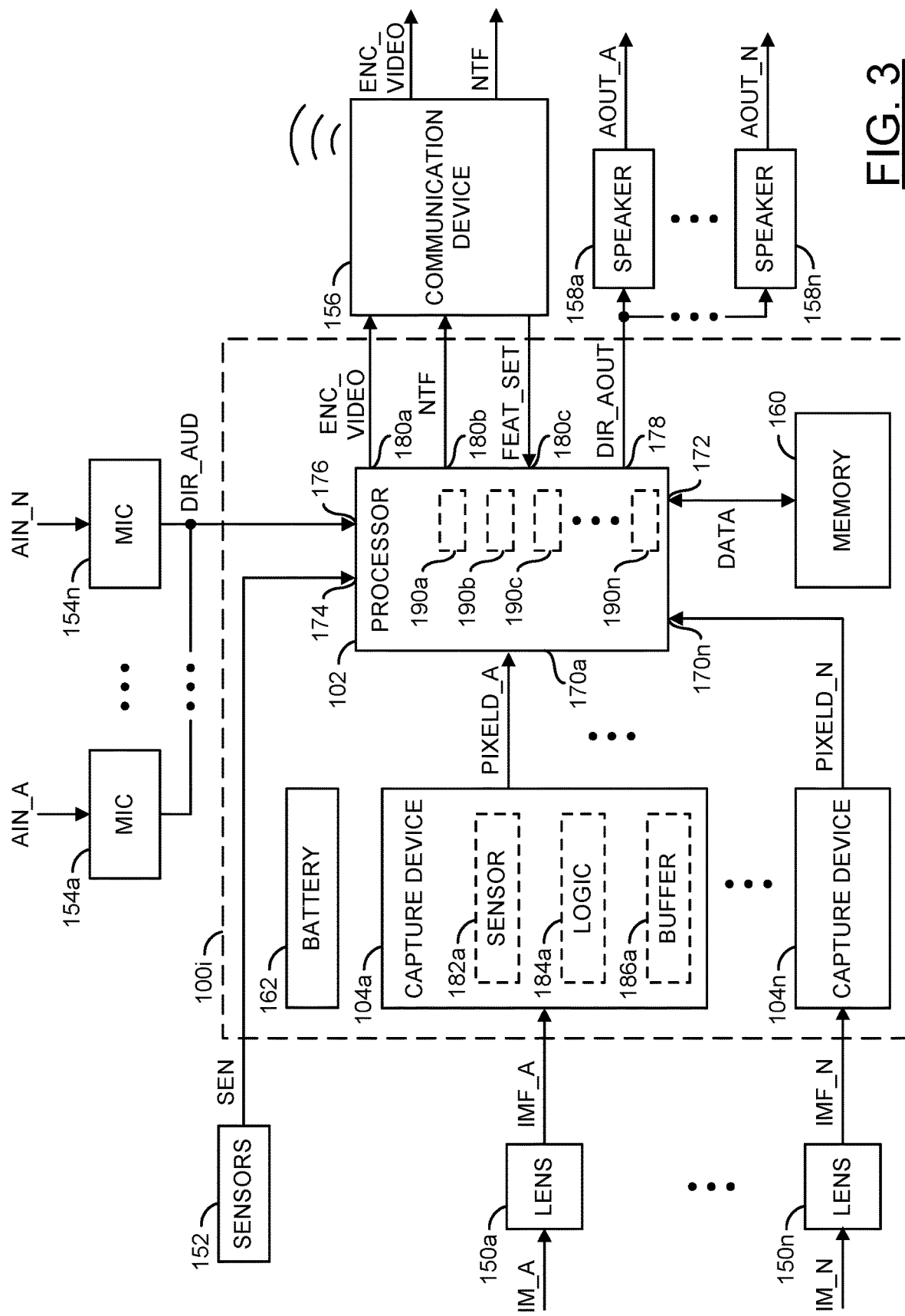
FIG. 3 is a block diagram illustrating components of an apparatus configured to provide computer vision enabled smart snooze.

Referring to FIG. 3, a block diagram illustrating components of an apparatus configured to provide computer vision enabled smart snooze is shown. A block diagram of the camera system 100i is shown. The camera system 100i may be a representative example of the camera systems 100a-100n shown in association with FIGS. 1-2. The camera system 100i generally comprises the processor 102, the capture devices 104a-104n, blocks (or circuits) 150a-150n, a block (or circuit) 152, blocks (or circuits) 154a-154n, a block (or circuit) 156, blocks (or circuits) 158a-158n, a block (or circuit) 160 and/or a block (or circuit) 162. The blocks 150a-150n may implement lenses. The circuit 152 may implement one or more sensors. The circuits 154a-154n may implement microphones (e.g., audio capture devices). The circuit 156 may implement a communication device. The circuits 158a-158n may implement audio output devices (e.g., speakers). The circuit 160 may implement a memory. The circuit 162 may implement a power supply (e.g., a battery). The camera system 100i may comprise other components (not shown). In the example shown, some of the components 150-158 are shown external to the camera system 100i. However, the components 150-158 may be implemented within and/or attached to the camera system 100i (e.g., the speakers 158a-158n may provide better functionality if not located inside a housing of the camera system 100i). The number, type and/or arrangement of the components of the camera system 100i may be varied according to the design criteria of a particular implementation.

In an example implementation, the processor 102 may be implemented as a video processor. The processor 102 may comprise inputs 170a-170n and/or other inputs. The processor 102 may comprise an input/output 172. The processor 102 may comprise an input 174 and an input 176. The processor 102 may comprise an output 178. The processor 102 may comprise outputs 180a-180b and an input 180c. The number of inputs, outputs and/or bi-directional ports implemented by the processor 102 may be varied according to the design criteria of a particular implementation.

In the embodiment shown, the capture devices 104a-104n may be components of the camera system 100i. In some embodiments, the capture devices 104a-104n may be separate devices (e.g., remotely connected to the camera system 100i, such as a drone, a robot and/or a system of security cameras) configured capture video data and send data to the camera system 100i. In one example, the capture devices 104a-104n may be implemented as part of an autonomous robot configured to patrol particular paths such as hallways. Similarly, in the example shown, the sensors 152, the microphones 154a-154n, the wireless communication device 156, and/or the speakers 158a-158n are shown external to the camera system 100i, but in some embodiments may be a component of (e.g., within) the camera system 100i.

The camera system 100i may receive one or more signals (e.g., IMF_A-IMF_N), a signal (e.g., SEN), a signal (e.g., FEAT_SET) and/or one or more signals (e.g., DIR_AUD). The camera system 100i may present a signal (e.g., ENC_VIDEO), a signal (e.g., NTF) and/or a signal (e.g., DIR_AOUT). The capture devices 104a-104n may receive the signals IMF_A-IMF_N from the corresponding lenses 150a-150n. The processor 102 may receive the signal SEN from the sensors 152. The processor 102 may receive the signal DIR_AUD from the microphones 154a-154n. The processor 102 may present the signal ENC_VIDEO and the signal NTF to the communication device 156 and receive the signal FEAT_SET from the communication device 156. For example, the wireless communication device 156 may be a radio-frequency (RF) transmitter. In another example, the communication device 156 may be a Wi-Fi module. In another example, the communication device 156 may be a device capable of implementing RF transmission, Wi-Fi, Bluetooth and/or other wireless communication protocols. In some embodiments, the signal ENC_VIDEO may be presented to a display device connected to the camera 100i. The processor 102 may present the signal DIR_AOUT to the speakers 158a-158n.

The lenses 150a-150n may capture signals (e.g., IM_A-IM_N). The signals IM_A-IM_N may be an image (e.g., an analog image) of the environment near the camera system 100i presented by the lenses 150a-150n to the capture devices 104a-104n as the signals IMF_A-IMF_N. The lenses 150a-150n may be implemented as an optical lens. The lenses 150a-150n may provide a zooming feature and/or a focusing feature. The capture devices 104a-104n and/or the lenses 150a-150n may be implemented, in one example, as a single lens-sensor assembly. In another example, the lenses 150a-150n may be separate from the capture devices 104a-104n. The capture devices 104a-104n are shown within the circuit 100i. In an example implementation, the capture devices 104a-104n may be implemented outside of the circuit 100i (e.g., along with the lenses 150a-150n as part of a lens/capture device assembly).

In some embodiments, two or more of the lenses 150a-150n may be configured as a stereo pair of lenses. For example, the camera 100i may implement stereo vision. The lenses 150a-150n implemented as a stereo pair may be implemented at a pre-determined distance apart from each other and at a pre-determined inward angle. The pre-determined distance and/or the pre-determined inward angle may be used by the processor 102 to build disparity maps for stereo vision.

The capture devices 104a-104n may be configured to capture image data for video (e.g., the signals IMF_A-IMF_N from the lenses 150a-150n). In some embodiments, the capture devices 104a-104n may be video capturing devices such as cameras. The capture devices 104a-104n may capture data received through the lenses 150a-150n to generate raw pixel data. In some embodiments, the capture devices 104a-104n may capture data received through the lenses 150a-150n to generate bitstreams (e.g., generate video frames). For example, the capture devices 104a-104n may receive focused light from the lenses 150a-150n. The lenses 150a-150n may be directed, tilted, panned, zoomed and/or rotated to provide a targeted view from the camera system 100i (e.g., a view for a video frame, a view for a panoramic video frame captured using multiple capture devices 104a-104n, a target image and reference image view for stereo vision, etc.). The capture devices 104a-104n may generate signals (e.g., PIXELD_A-PIXELD_N). The signals PIXELD_A-PIXELD_N may be pixel data (e.g., a sequence of pixels that may be used to generate video frames). In some embodiments, the signals PIXELD_A-PIXELD_N may be video data (e.g., a sequence of video frames). The signals PIXELD_A-PIXELD_N may be presented to the inputs 170a-170n of the processor 102.

The capture devices 104a-104n may transform the received focused light signals IMF_A-IMF_N into digital data (e.g., bitstreams). In some embodiments, the capture devices 104a-104n may perform an analog to digital conversion. For example, the capture devices 104a-104n may perform a photoelectric conversion of the focused light received by the lenses 150a-150n. The capture devices 104a-104n may transform the bitstreams into pixel data, images and/or video frames. In some embodiments, the pixel data generated by the capture devices 104a-104n may be uncompressed and/or raw data generated in response to the focused light from the lenses 150a-150n. In some embodiments, the output of the capture devices 104a-104n may be digital video signals.

The sensors 152 may comprise one or more input devices. The sensors 152 may be configured to detect physical input from the environment and convert the physical input into computer readable signals. The signal SEN may comprise the computer readable signals generated by the sensors 152. In an example, one of the sensors 152 may be configured to detect an amount of light and present a computer readable signal representing the amount of light detected. In another example, one of the sensors 152 may be configured to detect motion and present a computer readable signal representing the amount of motion detected. The sensors 152 may be configured to detect temperature (e.g., a thermometer, passive infrared (PIR) sensors, etc.), orientation (e.g., a gyroscope, a compass, etc.), a movement speed (e.g., an accelerometer), etc. The types of input detected by the sensors 152 may be varied according to the design criteria of a particular implementation.

The data provided in the signal SEN provided by the sensors 152 may be read and/or interpreted by the processor 102. The processor 102 may use the data provided by the signal SEN for various operations. In some embodiments, the processor 102 may use a light reading from the sensors 152 to determine whether to activate an infrared light source (e.g., to provide night vision). In another example, the processor 102 may use information about movement from an accelerometer and/or a gyroscope to perform motion correction on video frames generated. In yet another example, the processor 102 may use motion detected by a motion sensor (e.g., PIR) to enable video recording and/or send a notification. The types of operations performed by the processor 102 in response to the signal SEN may be varied according to the design criteria of a particular implementation.

The communication device 156 may send and/or receive data to/from the camera system 100i. In some embodiments, the communication device 156 may be implemented as a wireless communications module. In some embodiments, the communication device 156 may be implemented as a satellite connection to a proprietary system. In one example, the communication device 156 may be a hard-wired data port (e.g., a USB port, a mini-USB port, a USB-C connector, HDMI port, an Ethernet port, a DisplayPort interface, a Lightning port, etc.). In another example, the communication device 156 may be a wireless data interface (e.g., Wi-Fi, Bluetooth, ZigBee, cellular, etc.).

The communication device 156 may be configured to receive the signal FEAT_SET. The signal FEAT_SET may comprise a feature set. The feature set received may be used to detect events and/or objects. For example, the feature set may be used to perform the computer vision operations. The feature set information may comprise instructions for the processor 102 for determining which types of objects correspond to an object and/or event of interest.

The processor 102 may receive the signals PIXELD_A-PIXELD_N from the capture devices 104a-104n at the inputs 170a-170n. The processor 102 may send/receive a signal (e.g., DATA) to/from the memory 160 at the input/output 172. The processor 102 may receive the signal SEN from the sensors 152 at the input port 174. The processor 102 may receive the signal DIR_AUD from the microphones 154a-154n at the port 176. The processor 102 may send the signal DIR_AOUT to the speakers 158a-158n via the port 178. The processor 102 may send the signal ENC_VIDEO to the communication device 156 via the output port 180a and the signal NTF to the communication device 156 via the output port 180b. The processor 102 may receive the signal FEAT_SET from the communication device 156 via the input port 180c. In an example, the processor 102 may be connected through a bi-directional interface (or connection) to the capture devices 104a-104n, the sensors 152, the microphones 154a-154n, the communication device 156, and/or the speakers 158a-158n and/or the memory 160. The processor 102 may store and/or retrieve data from the memory 160. The memory 160 may be configured to store computer readable/executable instructions (or firmware). The instructions, when executed by the processor 102, may perform a number of steps.

The signal PIXELD_A-PIXELD_N may comprise raw pixel data providing a field of view captured by the lenses 150a-150n. The processor 102 may be configured to generate video frames from the pixel data PIXELD_A-

PIXELD_N. The video frames generated by the processor 102 may be used internal to the processor 102 (e.g., to perform video encoding, video transcoding, perform computer vision operations, etc.). In some embodiments, the video frames may be communicated to the memory 160 for temporary storage. The processor 102 may be configured to generate encoded video frames and communicate the encoded video frames to the communication device 156 as the signal ENC_VIDEO.

The processor 102 may be configured to make decisions based on analysis of the video frames generated from the signals PIXELD_A-PIXELD_N. The processor 102 may generate the signal ENC_VIDEO, the signal DATA, the signal DIR_AOUT and/or other signals (not shown). The signal ENC_VIDEO, the signal NTF, the signal DATA and/or the signal DIR_AOUT may each be generated (in part) based on one or more decisions made and/or functions performed by the processor 102. The decisions made and/or functions performed by the processor 102 may be determined based on data received by the processor 102 at the inputs 170a-170n (e.g., the signals PIXELD_A-PIXELD_N), the input 172, the input 174, the input 176, the input 180c and/or other inputs.

The inputs 170a-170n, the input/output 172, the input 174, the input 176, the output 178, the output 180a, the output 180b, the input 180c, and/or other inputs/outputs may implement an interface. The interface may be implemented to transfer data to/from the processor 102, the sensors 152, the communication device 156, the capture devices 104a-104n, the memory 160, the microphones 154a-154n, the speakers 158a-158n and/or other components of the camera system 100i. In one example, the interface may be configured to receive (e.g., via the inputs 170a-170n) the pixel data signals PIXELD_A-PIXELD_N each from a respective one of the capture devices 104a-104n. In another example, the interface may be configured to receive (e.g., via the input 174) sensor input from the sensors 152. In yet another example, the interface may be configured to receive (e.g., via the input 176) the directional audio DIR_AUD. In still another example, the interface may be configured to transmit encoded video frames (e.g., the signal ENC_VIDEO) and/or the converted data determined based on the computer vision operations to the communication device 156. In another example, the interface may be configured to transmit a notification (e.g., the signal NTF) in response to objects and/or events detected in the captured video data. In yet another example, the interface may be configured to receive the feature set information FEAT_SET (e.g., via the input port 180c) from the communication device 156. In still another example, the interface may be configured to transmit directional audio output (e.g., the signal DIR_AOUT) to each of the speakers 158a-158n. The interface may be configured to enable transfer of data and/or translate data from one format to another format to ensure that the data transferred is readable by the intended destination component. In an example, the interface may comprise a data bus, traces, connectors, wires and/or pins. The implementation of the interface may be varied according to the design criteria of a particular implementation.

The signal ENC_VIDEO may be presented to the communication device 156. In some embodiments, the signal ENC_VIDEO may comprise encoded video frames generated by the processor 102. In some embodiments, the encoded video frames may comprise a full video stream (e.g., encoded video frames representing all video captured by the capture devices 104a-104n). The encoded video frames may be encoded, cropped, stitched and/or enhanced versions of the pixel data received from the signals PIXELD_A-PIXELD_N. In an example, the encoded video frames may be a high resolution, digital, encoded, de-warped, stabilized, cropped, blended, stitched and/or rolling shutter effect corrected version of the signals PIXELD_A-PIXELD_N.

In some embodiments, the signal ENC_VIDEO may be generated based on video analytics (e.g., computer vision operations) performed by the processor 102 on the video frames generated from the pixel data PIXELD_A-PIXELD_N. The processor 102 may be configured to perform the computer vision operations to detect objects and/or events in the video frames and then convert the detected objects and/or events into statistics and/or parameters. In one example, the data determined by the computer vision operations may be converted to a human-readable format by the processor 102. The data from the computer vision operations may be used to detect objects and/or events to determine when to generate and/or suppress a notification and/or whether to initiate and/or stop video recording/storage. The computer vision operations may be performed by the processor 102 locally (e.g., without communicating to an external device to offload computing operations).

In some embodiments, the signal ENC_VIDEO may be data generated by the processor 102 (e.g., video analysis results, audio/speech analysis results, etc.) that may be communicated to a cloud computing service in order to aggregate information and/or provide training data for machine learning (e.g., to improve object detection, to improve audio detection, etc.). In some embodiments, the signal ENC_VIDEO may be provided to a cloud service for mass storage (e.g., to enable a user to retrieve the encoded video using a smartphone and/or a desktop computer). The type of information communicated by the signal ENC_VIDEO may be varied according to the design criteria of a particular implementation.

The signal NTF may be presented to the communication device 156. The signal NTF may comprise a notification. The notification may be presented to a user. The notification may comprise an indication of events and/or objects detected by the processor 102. The signal NTF may be generated according to an Application Program Interface (API) format to enable the notification to be read by a recipient device (e.g., as a push notification, as a text message, as an email, etc.). The processor 102 may be configured to interpret an event and/or object detected and translate the interpreted event/object into a human recognizable or discernable format (e.g., text, audio, etc.). In some embodiments, the notification may comprise a still image (e.g., a sample video frame). In some embodiments, the notification may be generated in response to input from the sensors 152 (e.g., an indication that motion was detected). While one notification signal NTF is shown, the camera system 100i may generate multiple notifications (e.g., NTF_A-NTF_N) to multiple destination devices. The implementation of the notification signal NTF may be varied according to the design criteria.

The circuit 100i may implement a camera system on chip (SoC). In some embodiments, the camera system 100i may be implemented as a drop-in solution (e.g., installed as one component). In an example, the camera system 100i may be a device that may be installed as an after-market product (e.g., a retro-fit for a drone, a retro-fit for a security system, etc.). In some embodiments, the camera system 100i may be a component of a security system. The number and/or types of signals and/or components implemented by the camera system 100i may be varied according to the design criteria of a particular implementation.

The video data of the targeted view captured by the capture devices 104a-104n may be generated from the signals/bitstreams/data PIXELD_A-PIXELD_N. The capture devices 104a-104n may present the signals PIXELD_A-PIXELD_N to the inputs 170a-170n of the processor 102. The signals PIXELD_A-PIXELD_N may be used by the processor 102 to generate the video frames/video data. In some embodiments, the signals PIXELD_A-PIXELD_N may be video streams captured by the capture devices 104a-104n. In some embodiments, the capture devices 104a-104n may be implemented in the camera system 100i. In some embodiments, the capture devices 104a-104n may be configured to add to existing functionality to the camera system 100i.

Each of the capture devices 104a-104n may comprise a block (or circuit) 182, a block (or circuit) 184, and/or a block (or circuit) 186 (e.g., the circuit 182a, the circuit 184a and the circuit 184n are shown as representative examples for the components of the capture devices 104a-104n). The circuit 182 may implement a camera sensor (e.g., a complementary metal-oxide-semiconductor (CMOS), RGB or RGB-IR sensor). The circuit 184 may implement a camera processor/logic. The circuit 186 may implement a memory buffer. As a representative example, the capture device 104a is shown comprising the sensor 182a, the logic block 184a and the buffer 186a. Similarly, the capture devices 104b-104n may comprise the camera sensors 182b-182n, the logic blocks 184b-184n and the buffers 186b-186n. The sensors 182a-182n may each be configured to receive light from the corresponding one of the lenses 150a-150n and transform the light into digital data (e.g., the bitstreams).

In one example, the sensor 182a of the capture device 104a may receive light from the lens 150a. The camera sensor 182a of the capture device 104a may perform a photoelectric conversion of the light from the lens 150a. In some embodiments, the sensor 182a may be an oversampled binary image sensor. In some embodiments, the camera sensor 182a may comprise an RGB sensor or an RGB-IR sensor. In some embodiments, the camera sensor 182a may comprise a rolling shutter sensor or a global shutter sensor. The logic 184a may transform the bitstream into a human-legible content (e.g., pixel data and/or video data). For example, the logic 184a may receive pure (e.g., raw) data from the camera sensor 182a and generate pixel data based on the raw data (e.g., the bitstream). The memory buffer 186a may store the raw data and/or the processed bitstream. For example, the frame memory and/or buffer 186a may store (e.g., provide temporary storage and/or cache) the pixel data and/or one or more of the video frames (e.g., the video signal).

The microphones 154a-154n may be configured to capture incoming audio and/or provide directional information about the incoming audio. Each of the microphones 154a-154n may receive a respective signal (e.g., AIN_A-AIN_N). The signals AIN_A-AIN_N may be audio signals from the environment near the camera system 100i. For example, the signals AIN_A-AIN_N may be ambient noise in the environment. The microphones 154a-154n may be configured to generate the signal DIR_AUD in response to the signals AIN_A-AIN_N. The signal DIR_AUD may be a signal that comprises the audio data from the signals AIN_A-AIN_N. The signal DIR_AUD may be a signal generated in a format that provides directional information about the signals AIN_A-AIN_N.

The microphones 154a-154n may provide the signal DIR_AUD to the interface 176. The camera system 100i may comprise the interface 176 configured to receive data (e.g., the signal DIR_AUD) from one or more of the microphones 154a-154n. In one example, data from the signal DIR_AUD presented to the interface 176 may be used by the processor 102 to determine the location of the source of the audio input. In another example, the microphones 154a-154n may be configured to determine the location of the audio input and present the location to the interface 176 as the signal DIR_AUD.

The number of microphones 154a-154n may be varied according to the design criteria of a particular implementation. The number of microphones 154a-154n may be selected to provide sufficient directional information about the incoming audio (e.g., the number of microphones 154a-154n implemented may be varied based on the accuracy and/or resolution of directional information acquired). In an example, 2 to 6 of the microphones 154a-154n may be implemented. In some embodiments, an audio processing component may be implemented with the microphones 154a-154n to process and/or encode the incoming audio signals AIN_A-AIN_N. In some embodiments, the processor 102 may be configured with on-chip audio processing to encode the incoming audio signals AIN_A-AIN_N. The microphones 154a-154n may capture audio of the environment 50. The camera system 100i may be configured to synchronize the audio captured with the images captured by the capture devices 104a-104n.

The processor 102 may be configured to execute computer readable code and/or process information. The processor 102 may be configured to receive input and/or present output to the memory 160. The processor 102 may be configured to present and/or receive other signals (not shown). The number and/or types of inputs and/or outputs of the processor 102 may be varied according to the design criteria of a particular implementation.

The processor 102 may receive the signals PIXELD_A-PIXELD_N, the signal SEN, the signal DIR_AUD, the signal FEAT_SET and/or the signal DATA. The processor 102 may make a decision based on data received at the inputs 170a-170n, the input 172, the input 174, the input 176, the input 180c and/or other input. For example, other inputs may comprise external signals generated in response to user input, external signals generated by the sensors 152, the microphones 154a-154n and/or internally generated signals such as signals generated by the processor 102 in response to analysis of the video frames and/or objects detected in the video frames. The processor 102 may adjust the video data (e.g., crop, digitally move, physically move the camera sensors 182a-182n, etc.) of the video frames. The processor 102 may generate the signal ENC_VIDEO and/or the signal DIR_AOUT in response to data received by the inputs 170a-170n, the input 172, the input 174, the input 176, the input 180c and/or the decisions made in response to the data received by the inputs 170a-170n, the input 172, the input 174, the input 176 and/or the input 180c. The various operations performed by the processor 102 may be performed locally (e.g., using the internal components of the camera 100i rather than offloading computing operations to external resources such as a cloud service).

The signal ENC_VIDEO, the signal NTF and/or the signal DIR_AOUT may be generated to provide an output in response to the captured video frames, the video encoding and/or the video analytics performed by the processor 102.

For example, the video analytics may be performed by the processor 102 in real-time and/or near real-time (e.g., with minimal delay).

The cropping, downscaling, blending, stabilization, packetization, encoding, compression and/or conversion performed by the processor 102 may be varied according to the design criteria of a particular implementation. For example, the video frames generated by the processor 102 may be a processed version of the signals PIXELD_A-PIXELD_N configured to enable detection of the objects and/or determination of the characteristics of the detected objects. In some embodiments, the video data may be encoded at a high bitrate. For example, the signal may be generated using a lossless compression and/or with a low amount of lossiness.

In some embodiments, the video frames may be some view (or derivative of some view) captured by the capture devices 104a-104n. For example, the video frames may comprise a portion of the panoramic video captured by the capture devices 104a-104n. In another example, the video frames may comprise a region of interest selected and/or cropped from the panoramic video frame by the processor 102 (e.g., upscaled, oversampled and/or digitally zoomed) to enable a high precision of object detection. In some embodiments, the video frames may provide a series of cropped and/or enhanced video frames that improve upon the view from the perspective of the camera system 100i (e.g., provides night vision, provides High Dynamic Range (HDR) imaging, provides more viewing area, highlights detected objects, provides additional data such as a numerical distance to detected objects, etc.) to enable the processor 102 to see the location better than a person would be capable of with human vision.

The memory 160 may store data. The memory 160 may be implemented as a cache, flash memory, DRAM memory, etc. The type and/or size of the memory 160 may be varied according to the design criteria of a particular implementation. The data stored in the memory 160 may correspond to a video file, user profiles, user permissions, a feature set, types of objects/events of interest, information about the configuration of the lenses 150a-150n, etc.

The battery 162 may be configured to provide power to the components of the camera 100i. The battery 162 may enable the camera 100i to operate without continual access to an external power supply. In an example, the battery 162 may comprise a lithium-ion type of battery. In another example, the battery 162 may comprise a supercapacitor. The type of battery 162 implemented may be varied according to the design criteria of a particular implementation.

The lenses 150a-150n (e.g., camera lenses) may be directed to provide a panoramic view from the camera system 100i. The lenses 150a-150n may be aimed to capture environmental data (e.g., light). The lens 150a-150n may be configured to capture and/or focus the light for the capture devices 104a-104n. Generally, the camera sensors 182a-182n may be located behind each of the respective lenses 150a-150n. Based on the captured light from the lenses 150a-150n, the capture devices 104a-104n may generate a bitstream and/or raw pixel data.

Embodiments of the processor 102 may perform video stitching operations on the signals PIXELD_A-PIXELD_N. In one example, each of the pixel data signals PIXELD_A-PIXELD_N may provide a portion of a panoramic view and the processor 102 may crop, blend, synchronize and/or align the pixel data from the signals PIXELD_A-PIXELD_N to generate the panoramic video frames. In some embodiments, the processor 102 may be configured to perform electronic image stabilization (EIS). The processor 102 may perform de-warping on the video frames. The processor 102 may perform intelligent video analytics on the de-warped video frames. The processor 102 discard the video frames after the video analytics and/or computer vision has been performed.

The encoded video frames may be processed locally. In one example, the encoded, panoramic video may be stored locally by the memory 160 to enable the processor 102 to facilitate the computer vision analysis internally (e.g., without first uploading video frames to a cloud service). The processor 102 may be configured to select the video frames to be encoded for the output video.

The processor 102 may receive an input to generate the video frames (e.g., the signals PIXELD_A-PIXELD_N) from the CMOS sensor(s) 182a-182n. The pixel data signals PIXELD_A-PIXELD_N may be enhanced by the processor 102 (e.g., color conversion, noise filtering, auto exposure, auto white balance, auto focus, etc.). Generally, the panoramic video may comprise a large field of view generated by one or more lenses/camera sensors. One example of a panoramic video may be an equirectangular 360 video. Equirectangular 360 video may also be called spherical panoramas. Panoramic video may be a video that provides a field of view that is larger than the field of view that may be displayed on a device used to playback the video. For example, the field of view captured by the camera system 100i may be used to generate panoramic video such as a spherical video, a hemispherical video, a 360 degree video, a wide angle video, a video having less than a 360 field of view, etc.

Panoramic videos may comprise a view of the environment near the camera system 100i. In one example, the entire field of view of the panoramic video may be captured at generally the same time (e.g., each portion of the panoramic video represents the view from the camera system 100i at one particular moment in time). In some embodiments (e.g., when the camera system 100i implements a rolling shutter sensor), a small amount of time difference may be present between some portions of the panoramic video. Generally, each video frame of the panoramic video comprises one exposure of the sensor (or the multiple sensors 182a-182n) capturing the environment near the camera system 100i.

In some embodiments, the field of view may provide coverage for a full 360 degree field of view. In some embodiments, less than a 360 degree view may be captured by the camera system 100i (e.g., a 270 degree field of view, a 180 degree field of view, etc.). In some embodiments, the panoramic video may comprise a spherical field of view (e.g., capture video above and below the camera system 100i). For example, the camera system 100i may be mounted on a ceiling and capture a spherical field of view of the area below the camera system 100i. In some embodiments, the panoramic video may comprise a field of view that is less than a spherical field of view (e.g., the camera system 100i may be configured to capture the ground below and the areas to the sides of the camera system 100i but nothing directly above). The implementation of the camera system 100i and/or the captured field of view may be varied according to the design criteria of a particular implementation.

In embodiments implementing multiple lenses, each of the lenses 150a-150n may be directed towards one particular direction to provide coverage for a full 360 degree field of view. In embodiments implementing a single wide angle (e.g., fish eye) lens (e.g., the lens 150a), the lens 150a may be located to provide coverage for the full 360 degree field of view (e.g., on the bottom of the camera system 100i in a ceiling mounted embodiment, on the bottom of a drone camera, etc.). In some embodiments, less than a 360 degree view may be captured by the lenses 150a-150n (e.g., a 270 degree field of view, a 180 degree field of view, etc.). In some embodiments, the lenses 150a-150n may move (e.g., the direction of the capture devices may be controllable). In some embodiments, one or more of the lenses 150a-150n may be configured to implement an optical zoom (e.g., the lenses 150a-150n may zoom in/out independent of each other).

In some embodiments, the camera system 100i may be implemented as a system on chip (SoC). For example, the camera system 100i may be implemented as a printed circuit board comprising one or more components (e.g., the capture devices 104a-104n, the processor 102, the communication device 156, the memory 160, etc.). The camera system 100i may be configured to perform intelligent video analysis on the video frames of the video. The camera system 100i may be configured to crop and/or enhance the video.

In some embodiments, the processor 102 may be configured to perform sensor fusion operations. The sensor fusion operations performed by the processor 102 may be configured to analyze information from multiple sources (e.g., the capture devices 104a-104n, the sensor 152 and the microphones 154a-154n). By analyzing various data from disparate sources, the sensor fusion operations may be capable of making inferences about the data that may not be possible from one of the data sources alone. For example, the sensor fusion operations implemented by the processor 102 may analyze video data (e.g., mouth movements of people) as well as the speech patterns from the directional audio DIR_AUD. The disparate sources may be used to develop a model of a scenario to support decision making. For example, the processor 102 may be configured to compare the synchronization of the detected speech patterns with the mouth movements in the video frames to determine which person in a video frame is speaking. The sensor fusion operations may also provide time correlation, spatial correlation and/or reliability among the data being received.

In some embodiments, the processor 102 may implement convolutional neural network capabilities. The convolutional neural network capabilities may implement computer vision using deep learning techniques. The convolutional neural network capabilities may be configured to implement pattern and/or image recognition using a training process through multiple layers of feature-detection. The computer vision and/or convolutional neural network capabilities may be performed locally by the processor 102. In some embodiments, the processor 102 may receive training data and/or feature set information from an external source. For example, an external device (e.g., a cloud service) may have access to various sources of data to use as training data, that may be unavailable to the camera system 100i. However, the computer vision operations performed using the feature set may be performed using the computational resources of the processor 102 within the camera system 100i.

The signal DIR_AOUT may be an audio output. For example, the processor 102 may generate output audio based on information extracted from the video frames PIXELD_A-PIXELD_N. The signal DIR_AOUT may be determined based on an event and/or objects determined using the computer vision operations. In one example, the signal DIR_AOUT may comprise an audio message for people detected. In some embodiments, the signal DIR_AOUT may not be generated until an event has been detected by the processor 102 using the computer vision operations.

The signal DIR_AOUT may comprise directional and/or positional audio output information for the speakers 158a-158n. The speakers 158a-158n may receive the signal DIR_AOUT, process the directional and/or positional information and determine which speakers and/or which channels will play back particular audio portions of the signal DIR_AOUT. The speakers 158a-158n may generate the signals AOUT_A-AOUT_N in response to the signal DIR_AOUT. The signals AOUT_A-AOUT_N may be the audio message played. For example, the speakers 158a-158n may emit a pre-recorded message in response to a detected event. The signal DIR_AOUT may be a signal generated in a format that provides directional information for the signals AOUT_A-AOUT_N.

The number of speakers 158a-158n may be varied according to the design criteria of a particular implementation. The number of speakers 158a-158n may be selected to provide sufficient directional channels for the outgoing audio (e.g., the number of speakers 158a-158n implemented may be varied based on the accuracy and/or resolution of directional audio output). In an example, 1 to 6 of the speakers 158a-158n may be implemented. In some embodiments, an audio processing component may be implemented by the speakers 158a-158n to process and/or decode the output audio signals DIR_AOUT. In some embodiments, the processor 102 may be configured with on-chip audio processing. In some embodiments, the signal DIR_AOUT may playback audio received from remote devices (e.g., smartphones) in order to implement a 2-way real-time audio communication.

The video pipeline of the processor 102 may be configured to locally perform de-warping, cropping, enhancements, rolling shutter corrections, stabilizing, downscaling, packetizing, compression, conversion, blending, synchronizing and/or other video operations. The architecture of the video pipeline of the processor 102 may enable the video operations to be performed on high resolution video and/or high bitrate video data in real-time and/or near real-time. The video pipeline of the processor 102 may enable computer vision processing on 4K resolution video data, stereo vision processing, object detection, 3D noise reduction, fisheye lens correction (e.g., real time 360-degree dewarping and lens distortion correction), oversampling and/or high dynamic range processing. In one example, the architecture of the video pipeline may enable 4K ultra high resolution with H.264 encoding at double real time speed (e.g., 60 fps), 4K ultra high resolution with H.265/HEVC at 30 fps and/or 4K AVC encoding. The type of video operations and/or the type of video data operated on by the processor 102 may be varied according to the design criteria of a particular implementation.

The sensors 182a-182n may each implement a high-resolution sensor. Using the high resolution sensors 182a-182n, the processor 102 may combine over-sampling of the image sensors 182a-182n with digital zooming within a cropped area. The over-sampling and digital zooming may each be one of the video operations performed by the processor 102. The over-sampling and digital zooming may be implemented to deliver higher resolution images within the total size constraints of a cropped area.

In some embodiments, one or more of the lenses 150a-150n may implement a fisheye lens. One of the video operations implemented by the processor 102 may be a dewarping operation. The processor 102 may be configured to dewarp the video frames generated. The dewarping may be configured to reduce and/or remove acute distortion caused by the fisheye lens and/or other lens characteristics.

For example, the dewarping may reduce and/or eliminate a bulging effect to provide a rectilinear image.

The processor 102 may be configured to crop (e.g., trim to) a region of interest from a full video frame (e.g., generate the region of interest video frames). The processor 102 may generate the video frames and select an area. In an example, cropping the region of interest may generate a second image. The cropped image (e.g., the region of interest video frame) may be smaller than the original video frame (e.g., the cropped image may be a portion of the captured video).

The area of interest may be dynamically adjusted based on the location of an audio source. For example, the detected audio source may be moving, and the location of the detected audio source may move as the video frames are captured. The processor 102 may update the selected region of interest coordinates and dynamically update the cropped section (e.g., the directional microphones 154a-154n may dynamically update the location based on the directional audio captured). The cropped section may correspond to the area of interest selected. As the area of interest changes, the cropped portion may change. For example, the selected coordinates for the area of interest may change from frame to frame, and the processor 102 may be configured to crop the selected region in each frame.

The processor 102 may be configured to over-sample the image sensors 182a-182n. The over-sampling of the image sensors 182a-182n may result in a higher resolution image. The processor 102 may be configured to digitally zoom into an area of a video frame. For example, the processor 102 may digitally zoom into the cropped area of interest. For example, the processor 102 may establish the area of interest based on the directional audio, crop the area of interest, and then digitally zoom into the cropped region of interest video frame.

The dewarping operations performed by the processor 102 may adjust the visual content of the video data. The adjustments performed by the processor 102 may cause the visual content to appear natural (e.g., appear as seen by a person viewing the location corresponding to the field of view of the capture devices 104a-104n). In an example, the dewarping may alter the video data to generate a rectilinear video frame (e.g., correct artifacts caused by the lens characteristics of the lenses 150a-150n). The dewarping operations may be implemented to correct the distortion caused by the lenses 150a-150n. The adjusted visual content may be generated to enable more accurate and/or reliable object detection.

Various features (e.g., dewarping, digitally zooming, cropping, etc.) may be implemented in the processor 102 as hardware modules. Implementing hardware modules may increase the video processing speed of the processor 102 (e.g., faster than a software implementation). The hardware implementation may enable the video to be processed while reducing an amount of delay. The hardware components used may be varied according to the design criteria of a particular implementation.

The processor 102 is shown comprising a number of blocks (or circuits) 190a-190n. The blocks 190a-190n may implement various hardware modules implemented by the processor 102. The hardware modules 190a-190n may be configured to provide various hardware components to implement a video processing pipeline. The circuits 190a-190n may be configured to receive the pixel data PIXELD_A-PIXELD_N, generate the video frames from the pixel data, perform various operations on the video frames (e.g., de-warping, rolling shutter correction, cropping, upscaling, image stabilization, etc.), prepare the video frames for communication to external hardware (e.g., encoding, packetizing, color correcting, etc.), parse feature sets, implement various operations for computer vision, etc. Various implementations of the processor 102 may not necessarily utilize all the features of the hardware modules 190a-190n. The features and/or functionality of the hardware modules 190a-190n may be varied according to the design criteria of a particular implementation. Details of the hardware modules 190a-190n and/or other components of the camera system 100i may be described in association with U.S. patent application Ser. No. 15/931,942, filed May 14, 2020, U.S. patent application Ser. No. 16/831,549, filed on Mar. 26, 2020, U.S. patent application Ser. No. 16/288,922, filed on Feb. 28, 2019, and U.S. patent application Ser. No. 15/593,493 (now U.S. Pat. No. 10,437,600), filed on May 12, 2017, appropriate portions of which are hereby incorporated by reference in their entirety.

The hardware modules 190a-190n may be implemented as dedicated hardware modules. Implementing various functionality of the processor 102 using the dedicated hardware modules 190a-190n may enable the processor 102 to be highly optimized and/or customized to limit power consumption, reduce heat generation and/or increase processing speed compared to software implementations. The hardware modules 190a-190n may be customizable and/or programmable to implement multiple types of operations. Implementing the dedicated hardware modules 190a-190n may enable the hardware used to perform each type of calculation to be optimized for speed and/or efficiency. For example, the hardware modules 190a-190n may implement a number of relatively simple operations that are used frequently in computer vision operations that, together, may enable the computer vision algorithm to be performed in real-time. The video pipeline may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects. The hardware modules 190a-190n may enable computationally intensive operations (e.g., computer vision operations, video encoding, video transcoding, etc.) to be performed locally on the camera 100i.

One of the hardware modules 190a-190n (e.g., 190a) may implement a scheduler circuit. The scheduler circuit 190a may be configured to store a directed acyclic graph (DAG). In an example, the scheduler circuit 190a may be configured to generate and store the directed acyclic graph in response to the feature set information received in the signal FEAT_SET. The directed acyclic graph may define the video operations to perform for extracting the data from the video frames. For example, the directed acyclic graph may define various mathematical weighting (e.g., neural network weights and/or biases) to apply when performing computer vision operations to classify various groups of pixels as particular objects.

The scheduler circuit 190a may be configured to parse the acyclic graph to generate various operators. The operators may be scheduled by the scheduler circuit 190a in one or more of the other hardware modules 190a-190n. For example, one or more of the hardware modules 190a-190n may implement hardware engines configured to perform specific tasks (e.g., hardware engines designed to perform particular mathematical operations that are repeatedly used to perform computer vision operations). The scheduler circuit 190a may schedule the operators based on when the operators may be ready to be processed by the hardware engines 190a-190n.

The scheduler circuit 190a may time multiplex the tasks to the hardware modules 190a-190n based on the availability of the hardware modules 190a-190n to perform the work. The scheduler circuit 190a may parse the directed acyclic graph into one or more data flows. Each data flow may include one or more operators. Once the directed acyclic graph is parsed, the scheduler circuit 190a may allocate the data flows/operators to the hardware engines 190a-190n and send the relevant operator configuration information to start the operators.

Each directed acyclic graph binary representation may be an ordered traversal of a directed acyclic graph with descriptors and operators interleaved based on data dependencies. The descriptors generally provide registers that link data buffers to specific operands in dependent operators. In various embodiments, an operator may not appear in the directed acyclic graph representation until all dependent descriptors are declared for the operands.

One of the hardware modules 190a-190n (e.g., 190b) may implement a convolutional neural network (CNN) module. The CNN module 190b may be configured to perform the computer vision operations on the video frames. The CNN module 190b may be configured to implement recognition of the objects and/or events through multiple layers of feature detection. The CNN module 190b may be configured to calculate descriptors based on the feature detection performed. The descriptors may enable the processor 102 to determine a likelihood that pixels of the video frames correspond to particular objects (e.g., the people, pets, items, text, etc.).

The CNN module 190b may be configured to implement convolutional neural network capabilities. The CNN module 190b may be configured to implement computer vision using deep learning techniques. The CNN module 190b may be configured to implement pattern and/or image recognition using a training process through multiple layers of feature-detection. The CNN module 190b may be configured to conduct inferences against a machine learning model.

The CNN module 190b may be configured to perform feature extraction and/or matching solely in hardware. Feature points typically represent interesting areas in the video frames (e.g., corners, edges, etc.). By tracking the feature points temporally, an estimate of ego-motion of the capturing platform or a motion model of observed objects in the scene may be generated. In order to track the feature points, a matching algorithm is generally incorporated by hardware in the CNN module 190b to find the most probable correspondences between feature points in a reference video frame and a target video frame. In a process to match pairs of reference and target feature points, each feature point may be represented by a descriptor (e.g., image patch, SIFT, BRIEF, ORB, FREAK, etc.). Implementing the CNN module 190b using dedicated hardware circuitry may enable calculating descriptor matching distances in real time.

The CNN module 190b may be a dedicated hardware module configured to perform feature detection of the video frames. The features detected by the CNN module 190b may be used to calculate descriptors. The CNN module 190b may determine a likelihood that pixels in the video frames belong to a particular object and/or objects in response to the descriptors. For example, using the descriptors, the CNN module 190b may determine a likelihood that pixels correspond to a particular object (e.g., a person, an item of furniture, a picture of a person, a pet, etc.) and/or characteristics of the object (e.g., a mouth of a person, a hand of a person, a screen of a television set, an armrest of a couch, a clock, etc.). Implementing the CNN module 190b as a dedicated hardware module of the processor 102 may enable the camera system 100i to perform the computer vision operations locally (e.g., on-chip) without relying on processing capabilities of a remote device (e.g., communicating data to a cloud computing service).

The computer vision operations performed by the CNN module 190b may be configured to perform the feature detection on the video frames in order to generate the descriptors. The CNN module 190b may perform the object detection to determine regions of the video frame that have a high likelihood of matching the particular object. In one example, the types of object to match against (e.g., reference objects) may be customized using an open operand stack (enabling programmability of the processor 102 to implement various directed acyclic graphs each providing instructions for performing various types of object detection). The CNN module 190b may be configured to perform local masking to the region with the high likelihood of matching the particular object(s) to detect the object.

In some embodiments, the CNN module 190b may determine the position (e.g., 3D coordinates and/or location coordinates) of various features (e.g., the characteristics) of the detected objects. In one example, the location of the arms, legs, chest and/or eyes may be determined using 3D coordinates. One location coordinate on a first axis for a vertical location of the body part in 3D space and another coordinate on a second axis for a horizontal location of the body part in 3D space may be stored. In some embodiments, the distance from the lenses 150a-150n may represent one coordinate (e.g., a location coordinate on a third axis) for a depth location of the body part in 3D space. Using the location of various body parts in 3D space, the processor 102 may determine body position, and/or body characteristics of the people 70a-70n.

The CNN module 190b may be pre-trained (e.g., configured to perform computer vision to detect objects based on the training data received to train the CNN module 190b). For example, the results of training data (e.g., a machine learning model) may be pre-programmed and/or loaded into the processor 102. The CNN module 190b may conduct inferences against the machine learning model (e.g., to perform object detection). The training may comprise determining weight values (e.g., neural network weights) for each of the layers. For example, weight values may be determined for each of the layers for feature extraction (e.g., a convolutional layer) and/or for classification (e.g., a fully connected layer). The weight values learned by the CNN module 190b may be varied according to the design criteria of a particular implementation.

The convolution operation may comprise sliding a feature detection window along the layers while performing calculations (e.g., matrix operations). The feature detection window may apply a filter to pixels and/or extract features associated with each layer. The feature detection window may be applied to a pixel and a number of surrounding pixels. In an example, the layers may be represented as a matrix of values representing pixels and/or features of one of the layers and the filter applied by the feature detection window may be represented as a matrix. The convolution operation may apply a matrix multiplication between the region of the current layer covered by the feature detection window. The convolution operation may slide the feature detection window along regions of the layers to generate a result representing each region. The size of the region, the type of operations applied by the filters and/or the number of layers may be varied according to the design criteria of a particular implementation.

Using the convolution operations, the CNN module 190b may compute multiple features for pixels of an input image in each extraction step. For example, each of the layers may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window operates on a pixel and nearby pixels (or sub-pixels), the results of the operation may have location invariance. The layers may comprise convolution layers, pooling layers, non-linear layers and/or fully connected layers. In an example, the convolution operations may learn to detect edges from raw pixels (e.g., a first layer), then use the feature from the previous layer (e.g., the detected edges) to detect shapes in a next layer and then use the shapes to detect higher-level features (e.g., facial features, pets, furniture, etc.) in higher layers and the last layer may be a classifier that uses the higher level features.

The CNN module 190b may execute a data flow directed to feature extraction and matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the CNN module 190b to extract features from the training data may be varied according to the design criteria of a particular implementation.

One of the hardware modules 190a-190n (e.g., 190c) may implement an audio analysis module. The audio analysis module 190c may be configured to perform audio analytics on audio received by the microphones 154a-154n. For example, the microphones 154a-154n may receive the signal DIR_AUD and the audio analysis module 190c may perform audio analytics on the signal DIR_AUD received at the input port 176.

The audio analytics performed by the audio analysis module 190c may comprise detecting a frequency and/or frequency range of input audio, determining a frequency signature, detecting an amplitude of the input audio, performing voice recognition, etc. Detecting the frequency signature of the input audio may enable the audio analysis module 190c to compare the frequency signature of the input audio to stored frequency signatures. Comparing the frequency signatures may enable the audio analysis module 190c to determine a match between the input audio and the stored audio (e.g., determine whether the input audio was spoken by a person that is the same age and/or gender as the stored audio, determine whether the input audio was spoken by the same person as the stored audio, perform voice recognition, etc.).

In some embodiments, the audio analysis module 190c may be configured to parse the input audio to determine the content of the input audio. In one example, the audio analysis module 190c may be configured to perform speech-to-text operations to generate a transcript of the input audio. In another example, the audio analysis module 190c may be configured to interpret the parsed audio to understand and/or react to the input audio. For example, the audio analysis module 190c may understand that the input audio comprising the word "yes" is an affirmative response. In another example, the audio analysis module 190c may be configured to understand that the input audio comprises a name and match the name to a stored name. In yet another example, the audio analysis module 190c may be configured to recognize a particular word (or passphrase) as a command, and perform the command in response to detecting the particular word. The type of audio analytics performed by the audio analysis module 190c may be varied according to the design criteria of a particular implementation.

Each of the hardware modules 190a-190n may implement a processing resource (or hardware resource or hardware engine). The hardware engines 190a-190n may be operational to perform specific processing tasks. In some configurations, the hardware engines 190a-190n may operate in parallel and independent of each other. In other configurations, the hardware engines 190a-190n may operate collectively among each other to perform allocated tasks. One or more of the hardware engines 190a-190n may be homogenous processing resources (all circuits 190a-190n may have the same capabilities) or heterogeneous processing resources (two or more circuits 190a-190n may have different capabilities).

Figure 4:
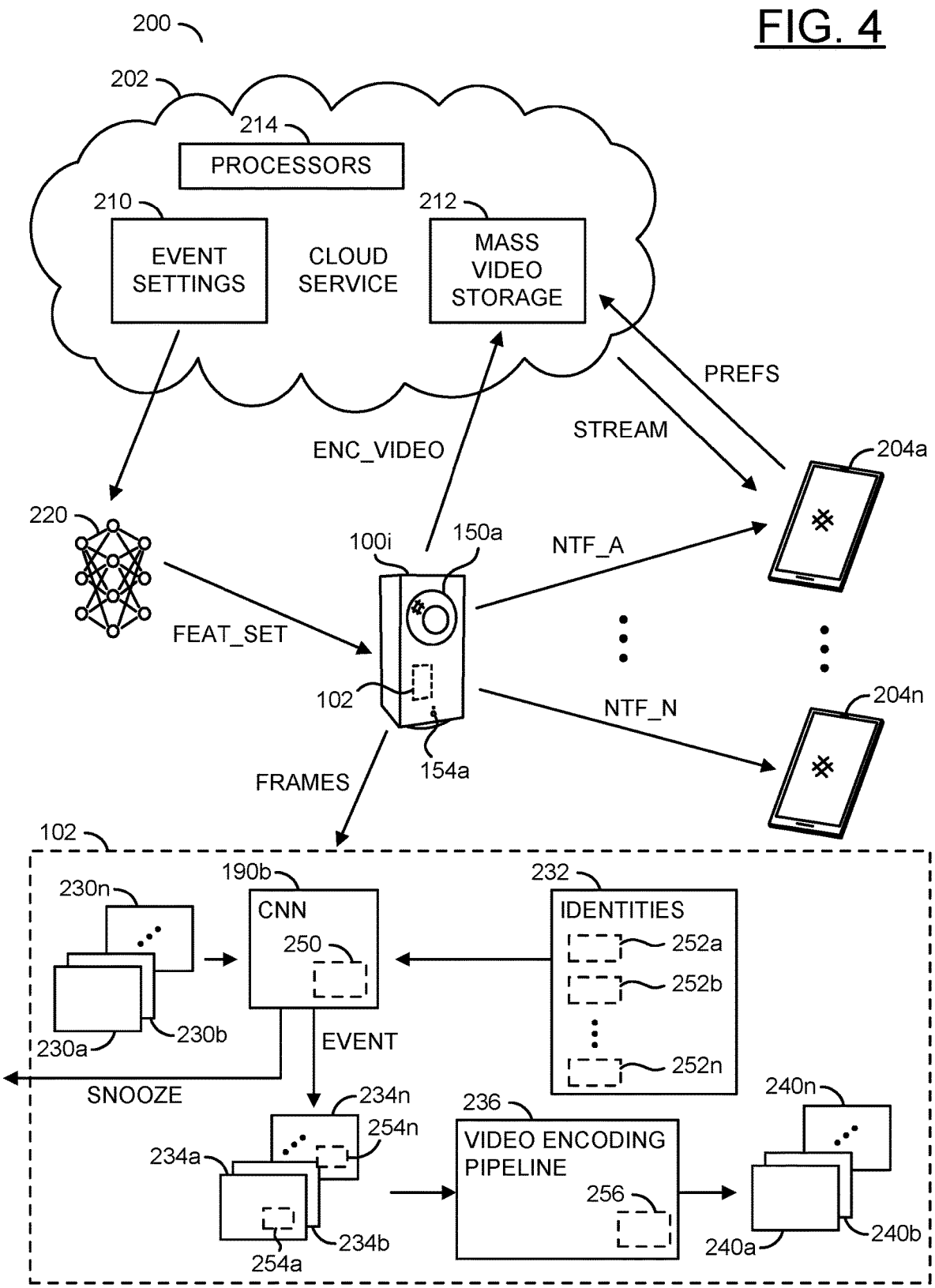
FIG. 4 is a diagram illustrating an interconnected camera (i) communicating with a cloud server and (ii) providing notifications based on using a video processing pipeline detecting particular individuals.

Referring to FIG. 4, a diagram illustrating an interconnected camera (i) communicating with a cloud server and (ii) providing notifications based on using a video processing pipeline detecting particular individuals is shown. An example scenario 200 is shown. The example scenario 200 may comprise the camera system 100i, a server 202 and/or remote devices 204a-204n. The lens 150a and the microphone 154a are shown on the camera system 100i. The processor 102 is shown within the camera system 100i. The example scenario 200 may further comprise a visualization of the processor 102 and/or a machine readable version of a DAG 220.

The server 202 may implement a cloud service. The cloud service 202 may comprise a block (or module) 210, a block (or module) 212 and/or a block (or module) 214. The module 210 may implement event settings storage. The module 212 may implement mass video storage. The event settings storage 210 and/or the mass video storage 212 may be implemented using one or more types of memory implemented by the cloud service 202. The module 214 may implement one or more processors. The cloud service 202 may comprise other components (not shown). The number, type and/or arrangement of the components of the cloud service 202 may be varied according to the design criteria of a particular implementation.

The cloud service 202 may be implemented as part of a cloud computing platform (e.g., distributed computing). In an example, the cloud service 202 may be implemented as a group of cloud-based, scalable server computers. By implementing a number of scalable servers, additional resources (e.g., power, processing capability, memory, etc.) may be available to process and/or store variable amounts of data. For example, the cloud service 202 may be configured to scale (e.g., provision resources) based on demand. The cloud service 202 may implement scalable computing (e.g., cloud computing). The scalable computing may be available as a service to allow access to processing and/or storage resources without having to build infrastructure.

In some embodiments, the cloud service 202 may be configured to provide resources such as training data and/or a database of feature maps (e.g., feature maps of recognized objects that may be used as a basis to perform object recognition and/or classification). Generating the feature maps may be performed by the cloud service 202 since the cloud service 202 may have access to a large amount of training data (e.g., all the video frames uploaded by the cameras 100a-100n and/or other devices). Feature maps and/or training data may be stored in the event settings storage 210. The event settings storage 210 may be configured to provide a feature set to the camera system 100i in response to the particular events and/or objects selected for detection. In one example, individual users may select different types of events and/or objects to detect (e.g., objects of interest). For example, the objects of interest may be particular people (e.g., faces of people). The types of feature sets provided to the camera system 100i may be varied depending on the objects of interest selected by each user.

In some embodiments, the cloud service 202 may be configured to provide storage resources. The mass video storage 212 may be configured to provide long-term storage of video data. For example, the cloud service 202 may comprise storage resources (e.g., hard drives, solid state drives, etc.) that enable considerably more storage capacity than available internally on the camera system 100i.

The cloud service 202 may have access to considerably more bandwidth capacity than the camera system 100i. The bandwidth capacity available to the cloud service 202 may enable the cloud service 202 to stream video to the remote devices 204a-204n. A signal (e.g., STREAM) is shown. The signal STREAM may represent streaming video communicated to one or more of the remote devices 204a-204n.

The remote devices 204a-204n may be various user devices. In the example shown, the remote devices 204a-204n may be smartphones. In another example, the remote devices 204a-204n may be desktop computers, laptop computers, tablet computing devices, smartwatches, etc. The types of remote devices 204a-204n implemented may be varied according to the design criteria of a particular implementation.

The remote devices 204a-204n may enable end users to communicate with the camera systems 100a-100n and/or the cloud service 202. In one example, a companion application may be configured to operate on the remote devices 204a-204n. The companion application may enable users to adjust settings of the camera systems 100a-100n. The companion application may enable users to view video captured by the camera systems 100a-100n (e.g., directly from the camera systems 100a-100n and/or streamed via the cloud service 202). For example, the remote devices 204a-204n may be configured to receive the signal STREAM and playback the video stream to the end user.

A signal (e.g., PREFS) is shown. The signal PREFS may provide user preferences to the cloud service 202. In an example, the companion app implemented on the remote devices 204a-204n may enable the end users to adjust various settings for the camera systems 100a-100n and/or the video captured by the camera systems 100a-100n. In some embodiments, the settings may be stored in the cloud service 202 as the event settings storage 210 (e.g., using a secured account). The signal PREFS may comprise the objects and/or events of interest selected by the user. In one example, the signal PREFS may enable the user to select people and animals as the objects and/or events of interest. The signal PREFS may enable the user to configure whether or not to suppress notifications based on faces and/or people recognized using the computer vision operations. The data from the signal PREFS may be stored in the event settings storage 210.

The edge AI camera 100i may be configured to communicate with the remote cloud service 202 and/or the user devices (e.g., smartphones) 204a-204n. The edge AI camera 100i may be a representative example of any of the camera systems 100a-100n. The edge AI camera 100i is shown communicating the signal ENC_VIDEO, a signal (e.g., FRAMES) and/or one or more of the signals NTF_A-NTF_N. The edge AI camera 100i is shown receiving the signal FEAT_SET. The signal FRAMES may comprise video frames generated by the processor 102 in response to the pixel data PIXELD_A-PIXELD_N. The signals NTF_A-NTF_N may be notification signals communicated to the remote devices 204a-204n. The edge AI camera 100i may be configured to communicate and/or generate other signals (not shown). The number, type and/or format of the signals communicated and/or generated by the edge AI camera 100i may be varied according to the design criteria of a particular implementation.

The edge AI camera 100i may be configured to upload the encoded video frames ENC_VIDEO to the cloud service 202 and/or the remote devices 204a-204n. The edge AI camera 100i may encode the video frames before uploading to limit an amount of bandwidth consumed compared to uploading unencoded video frames. In some embodiments, the encoded video frames ENC_VIDEO may comprise all of the video data generated by the edge AI camera 100i. In some embodiments, the encoded video frames ENC_VIDEO may comprise video clips and/or still images generated internally by the edge AI camera 100i.

The signals NTF_A-NTF_N may comprise notifications that may be accessed using the remote devices 204a-204n. In one example, the notification signals NTF_A-NTF_N may provide a message that a particular object and/or event has been detected. For example, the notification may comprise a text message such as, "A person has been detected at 2:54 pm" and a link to the video comprising the corresponding object and/or event. In the example shown, the notification signals NTF_A-NTF_N may be generated by the edge AI camera 100i (e.g., direct communication between the camera system 100i and the remote devices 204a-204n). In some embodiments, the signals NTF_A-NTF_N may be combined with the signal ENC_VIDEO (e.g., the video stream may be sent directly from the edge AI camera 100i to one or more of the remote devices 204a-204n along with the notification).

In some embodiments, the notification signals NTF_A-NTF_N may be generated by the cloud service 202. For example, the edge AI camera 100i may be configured to tag the video frames with metadata about the particular objects detected. The cloud service 202 may compare the metadata in the video frames uploaded to the cloud service 202 with the event settings storage 210. When the cloud service 202 detects a match between the metadata in the video frames and the event settings for a particular user, the cloud service 202 may communicate one of the signals NTF_A-NTF_N to the appropriate one of the remote devices 204a-204n. In an example, the cloud server 202 may securely store the contact information for the owners of the smartphones 204a-204n (e.g., user information about registered users).

The machine readable DAG 220 of the event settings 210 is shown. The machine readable DAG 220 may comprise a neural network and/or computer readable instructions that define the types of objects and/or events that may be detected by the processor 102 of the camera system 100i. For example, the machine readable DAG 220 may be generated according to an API (e.g., a format) compatible with the camera system 100i. The machine readable DAG 220 may comprise one or more neural networks (e.g., each neural network may correspond to various types of objects to detect based on the event settings 210). The machine readable DAG 220 may be provided to the camera system 100i in the signal FEAT_SET.

The camera system 100i may receive the signal FEAT_SET from the cloud service 202. The processor 102 may convert the feature set information in the signal FEAT_SET to detection parameters. The camera system 100i may capture pixel data and generate the video frames from the pixel data PIXELD_A-PIXELD_N. The camera system 100i is shown generating the signal FRAMES. The signal FRAMES may comprise the video frames generated by the processor 102. The signal FRAMES may comprise data used internally by the processor 102. In an example, the signal FRAMES (e.g., unencoded video frames) may not be communicated from the camera system 100i.

The user may select settings using an app on the smartphones 204a-204n (e.g., the signal PREFS). The preferences may be stored as the event settings 210 in the cloud service 202. The cloud service 202 may be configured to provide neural network parameters (e.g., the feature set) for the processor 102 in response to the event settings 210 for a particular user (e.g., the signal FEAT_SET). The processor 102 may receive the feature set to detect objects/events. The edge AI camera 100i may be configured to upload the encoded video frames (e.g., the smart timelapse video) to the cloud service 202. The encoded video frames ENC_VIDEO may be stored in the mass video storage 212 of the cloud service 202. The user may access the encoded video frames using the smartphones 204a-204n. In an example, the smartphones 204a-204n may connect to the mass video storage 212 and download the video streams. The cloud service 202 and/or the edge AI camera 100i may further provide notifications (e.g., the signals NTF_A-NTF_N) to the smartphones 204a-204n based on content in the metadata tags of the smart timelapse video.

In some embodiments, the feature set data (or training data that may be used by the processor 102 to generate the feature set data) may be sent directly from the remote devices 204a-204n. For example, images of particular people may be communicated via a local network in order to protect a privacy of people and/or faces of people that may be communicated (e.g., to generate feature set data).

In an example, the companion app implemented on the remote devices 204a-204n may enable the end users to adjust various settings for the camera systems 100a-100n and/or the video captured by the camera systems 100a-100n. In some embodiments, the settings may be stored in the cloud service 202 as part of the event settings storage 210 (e.g., using a secured account). However, in some embodiments, to ensure privacy protection, the settings may instead avoid communication to/from the cloud service 202. For example, a direct connection and/or a communication that does not transfer data to the cloud service 202 may be established between one or more of the remote devices 204a-204n and the edge AI camera 100i.

The faces and/or identities of various people that may be selected by the user. The user may select people (e.g., faces) as privacy events. In one example, the user may select people (e.g., faces) to enable the processor 102 to distinguish between people that are considered privacy events and people that are not considered privacy events. For example, the user may select settings using an app on the smartphones 204a-204n and the preferences may be communicated directly to the edge AI camera 100i (e.g., to prevent faces from being stored in the cloud service 202). For example, there may be no concern of leaking family privacy information (e.g., video and/or images of family members and/or the behavior of family members) because the faces of the family members may be enrolled locally using the app on the remote devices 204a-204n and the feature set generated from the enrolled faces may be sent via a local network rather than through the cloud service 202.

A video processing pipeline of the processor 102 is shown. The video processing pipeline of the processor 102 may comprise the CNN module 190b, raw video frames 230a-230n, a block (or circuit) 232, tagged video frames 234a-234n, a block (or circuit) 236 and/or encoded video frames 240a-240n. The circuit 232 may implement an identities database. The circuit 236 may implement a video encoding pipeline. The video processing pipeline may be implemented using one or more of the hardware modules 190a-190n. The video processing pipeline of the processor 102 may comprise other components and/or data (not shown). The number, type and/or arrangement of the components and/or data in the video processing pipeline of the processor 102 may be varied according to the design criteria of a particular implementation.

The processor 102 may generate raw video frames 230a-230n in response to the pixel data captured by the capture devices 104a-104n. For example, the raw video frames 230a-230n may be the data in the signal FRAMES. The raw video frames 230a-230n may be analyzed by the CNN module 190b. The CNN module 190b may comprise a block (or circuit) 250. The block 250 may comprise an AI model (e.g., the DAG). The CNN module 190b may be configured to detect objects and/or events of interest and/or identities based on the preferences of the user (e.g., detect one or all of people, vehicles, animals, movement, sound, etc. as an event and/or detect various faces to identify particular individuals). The AI model 250 may be configured to implement the machine readable DAG 220 to detect various objects and/or events and/or the machine readable DAG 222 to detect various identities and/or faces (e.g., to determine privacy events).

The identities database 232 may comprise blocks (or modules) 252a-252n. In an example, the identities database 232 may be loaded from the memory 160 (e.g., received as part of the signal DATA). The modules 252a-252n may comprise feature sets that correspond to particular people (e.g., identified people). The identified people 252a-252n may comprise face information (e.g., a feature set that may enable facial recognition by analyzing the video data of a face). The identified people 252a-252n may comprise body shapes, sizes and/or characteristics (e.g., feature sets that enable detecting a person based on a body and/or movement of a person). The identified people 252a-252n may comprise voice signatures (e.g., audio data) that may enable detecting a person based on voice recognition. While the identification of people may be generally described in association with computer vision operations, similar operations may be performed using the audio analysis module 190c to detect people based on voice recognition and/or to supplement the computer vision operations with information determined using the voice recognition.

The identified people 252a-252n may be used by the CNN module 190b to detect whether the video frames 230a-230n comprise a particular person. The identified people 252a-252n may be used to distinguish between a generic person detected in the video frames 230a-230n and a particular individual. In an example, one of the identified people 252a-252n may correspond to the homeowner. In another example, one or more of the identified people 252a-252n may correspond to a family member of the homeowner. In yet another example, one or more of the identified people 252a-252n may correspond to an employee that has access to the building 50. The number, type of people and/or type of data used to identify the identified people 252a-252n may be varied according to the design criteria of a particular implementation.

The CNN module 190b may be configured to tag the video frames 230a-230n when an event and/or particular person is detected (e.g., an object of interest). The CNN module 190b may be configured to determine which of the video frames 230a-230n have no event detected (e.g., a particular person is not detected). The tagged video frames 232a-232n are shown representing the video frames 230a-230n after being analyzed by the CNN module 190b. One or more of the tagged video frames 234a-234n may comprise video data that corresponds to one of the identified people 252a-252n.

The CNN module 190b may be configured to perform object detection, classify objects, and/or extract data from the video frames 230a-230n. The CNN module 190b may compare the data extracted (e.g., various symbols and/or confidence values indicating the likelihood that particular objects were detected) with the detection parameters (e.g., the feature set information in the identities module 232) of the signal FEAT_SET according to the machine readable DAG 220 (e.g., the data corresponding to the identified people 252a-252n) to determine whether or not one of the people of interest has been detected. In an example, the feature set signal FEAT_SET may provide instructions to detect the identified people 252a-252n and the camera system 100i may use the detection parameters to monitor whether one or more of the identified people 252a-252n have been detected in the video frames 230a-230n.

In some embodiments, the CNN module 190b and/or audio analytics module 190c may determine when one of the identified people 252a-252n has been detected. For example, the detection of an identified person 252a-252n may comprise an amplitude and/or type of audio detected and/or a combination of audio and video analysis (e.g., using computer vision to detect a person and using audio analysis to determine if the person is making a lot of noise). In some embodiments, the identified people 252a-252n may comprise one or more of feature set data for video analysis and/or audio analysis. For example, the identified people 252a-252n may store audio characteristics (e.g., voice frequencies, voice timbre and/or keywords) that may be used by the audio analysis module 190c to identify whether one of the identified people 252a-252n is within the field of view of the lens 150a.

The CNN module 190b may compare the data extracted (e.g., various symbols and/or confidence values indicating the likelihood that particular people were detected) with the detection parameters (e.g., the feature set information) of the identified people 252a-252n to determine whether or not a particular person has been detected. In an example, the feature set signal FEAT_SET may provide instructions to detect when a family member of the user is detected and the camera system 100i may use the detection parameters to monitor whether the family member has been detected in the video frames 230a-230n. Similarly, the audio analysis module 190c may perform audio analytics in response to audio data stored for the identified people 252a-252n. In one example, the signal FEAT_SET may comprise feature set data that corresponds to audio data. In some embodiments, the CNN module 190b and/or audio analytics module 190c may determine when a particular person has been detected. For example, the identification of a particular person may comprise a particular audio frequency (e.g., a vocal signature) of a particular person. The feature set information stored as the identified people 252a-252n may be used to enable the CNN module 190b to distinguish between individuals that should have privacy protection (e.g., pre-defined individuals such as family members, friends, etc.) and other individuals that should be detected as events of interest (e.g., strangers, potential criminals, solicitors, visitors, etc.).

The tagged video frames 234a-234n may comprise respective metadata tags 254a-254n. The metadata tags 254a-254n may comprise labels that indicate the objects, characteristics, identities, faces and/or events detected by the CNN module 190b and/or a timestamp indicating when (or in which order) the video frames were captured. In some embodiments, the metadata tags 254a-254n may be used to generate training data (e.g., the metadata tags 254a-254n may be tagged as correct and/or incorrect based on whether the metadata tags 254a-254n accurately identify the objects, events and/or characteristics). The training data may be used to refine the feature set used to detect objects and/or identities (e.g., to adjust neural network weight values and/or bias values for the AI model 250).

The tagged video frames 234a-234n may be provided to the video encoding pipeline 236. The tagged video frames 234a-234n may be encoded at a particular frame rate and/or in a particular format (e.g., compressed and/or transcoded). The video encoding pipeline 236 may be configured to encode video frames in real time (e.g., HEVC, AVC, H264, etc.). The video encoding pipeline 236 may be configured to generate the encoded video frames 240a-240n. The encoded video frames 240a-240n may be the communicated to the cloud service 202 and/or one or more of the remote devices 204a-204n. The encoded video frames 240a-240n may be stored locally on the camera device 100i (e.g., in the memory 160 and/or an expansion storage such as a microSD card).

The video encoding pipeline 236 may comprise a block (or module) 256. The module 256 may be configured to apply various effects to the tagged video frames 234a-234n. For example, the module 256 may be configured to crop the selected video frames, dewarp the selected video frames, apply colorization (or remove color) from the selected video frames, apply blurs to sections of the video frames, etc. In an example, a blur effect may be applied to portions of the selected video frames to hide and/or censor particular objects (e.g., hide the identity of a known person for privacy reasons, hide naked body parts to prevent nudity from being uploaded, etc.).

The video encoding pipeline 236 and/or the module 256 may determine when and/or where to apply the obscure effect (e.g., a blur) to the tagged video frames 234a-234n based on the metadata 254a-254n (e.g., indicating that one of the pre-defined identities 252a-252n has been detected). When the module 256 detects that one of the tagged video frames 234a-234n has one of the identified people 252a-252n in the video data, the module 256 may apply the distortion effect (e.g., a blur) to the video frames as designated by the metadata 254a-254n. The distortion effect may be applied to the location of the pre-defined identity (e.g., the face of the person). In an example, the metadata tags 254a-254n may comprise a location of the face of one of the identified people 252a-252n to enable the module 256 to apply the distortion effect only where the pre-defined identity is located (e.g., to ensure other people may be identified).

The distortion effect applied by the module 256 may be configured to ensure the privacy of the particular person (e.g., hide the identity of the person). The distortion effect may be a trade-off between including additional video data (e.g., including the video frames instead of excluding the video frames altogether or stopping recording) and preserving the privacy of pre-defined people. In one example, the distortion effect may be a blur effect applied to the location of the face of the person. In another example, the distortion effect may be a mosaic effect applied to the location of the face of the person. In yet another example, the distortion effect may be an alternate graphic applied to the face of the person (e.g., replacing the face of the person with a cartoon dog). In still another example, body parts of the person other than the face may be distorted. After applying the distortion effect to the tagged video frames 234a-234n, the encoded video frames 240a-240n may be output. The type and/or amount of the distortion effect applied by the module 256 may be varied according to the design criteria of a particular implementation.

The processor 102 may be configured to perform the computer vision operations before the video frames 230a-230n are encoded. Performing the computer vision operations before the video frames 230a-230n are encoded may enable the computer vision operations to be performed without the cycle cost of first decoding the video frames. For example, if the computer vision is performed by the cloud service 202, the encoded video frames 242a-242n are sent to the cloud servers 202 and the cloud server 202 wastes CPU cycles and power by first decoding the encoded video frames 240a-240n, and then performing the computer vision operations and then transcoding the video stream for communication device the remote devices 204a-204n. Furthermore, sending the video frames 230a-230n to the cloud service 202 to perform the computer vision operations would compromise the privacy of the pre-defined identities.

The processor 102 may be configured to perform the detection of the identified people 252a-252n in the video frames 230a-230n entirely local to the edge AI camera 100i. The processor 102 may implement the CNN module 190b. The CNN module 190b may be a hardware component (or multiple hardware components working together) of the processor 102 that implements CNN-based detection techniques (or other types of detection techniques) that operate entirely on the processor 102 to perform computer vision operations such as object detection, object tracking, object classification, facial recognition, etc. The hardware accelerated CNN module 190b may enable the object/event detection to be performed on the camera system 100i (e.g., without relying on computing resources of the cloud server 202 to perform object detection).

In some embodiments, the processor 102 may use software acceleration for computer vision and/or a combination of hardware accelerated and software accelerated computer vision. With computer vision operations running on either a hardware based CNN engine 190b and/or a software based CNN engine, the processor 102 implemented in the edge device 100i may be able to detect events of one or more types, and apply the metadata tags 254a-254n to the video frames captured.

The CNN module 190b is shown generating a signal (e.g., SNOOZE). The signal SNOOZE may be configured to control whether or not the notification signals NTF_A-NTF_N are communicated. In the example shown, the signal SNOOZE may be a signal. In some embodiments, the signal SNOOZE may be used internally by the processor 102 (e.g., operate as a flag). The signal SNOOZE may be adjusted in response to the CNN module 190b detecting one or more of the identified people 252a-252n in the captured video frames 230a-230n.

When the signal (or flag) SNOOZE is active (e.g., when one or more of the identified people 252a-252n is detected), the processor 102 may be configured to suppress the generation of the notifications NTF_A-NTF_N. For example, when the homeowner is detected in the video frames, the notification may not be sent to the remote devices 204a-204n (e.g., even though an event that may normally result in a notification being sent is detected). When the signal (or flag) SNOOZE is inactive (e.g., when one or more of the identified people 252a-252n is not detected, or no longer detected), then the processor 102 may be configured to re-enable the generation of the notifications NTF_A-NTF_N. For example, when the homeowner is no longer detected in the video frames, notifications may be sent to the remote devices 204a-204n when an event that would normally result in a notification being sent is next detected.

The signal SNOOZE may control a mode of operation of the camera device 100i. For example, when the signal SNOOZE is active, the camera device 100i may implement a mode of operation that suppresses notifications. In another example, when the signal SNOOZE is inactive, the camera device 100i may implement a mode of operation that enables notifications to be sent.

In some embodiments, the signal SNOOZE may be further configured to control whether or not the encoded video frames 240a-240n are generated. For example, when one of the identified people 252a-252n is detected, the processor 102 may activate the signal SNOOZE and in response to the signal SNOOZE, the encoded video frames 240a-240n may not be generated (or stored). Not generating (or storing), the encoded video frames 240a-240n may enable the CNN module 190b to continue to monitor the video frames 230a-230n for the identified people 252a-252n (e.g., in order to re-enable recording of the encoded video frames 240a-240n) to determine when to deactivate the signal SNOOZE. Not generating (or storing), the encoded video frames 240a-240n may enable the CNN module 190b to protect the privacy of the identified people 252a-252n detected.

In some embodiments, the signal SNOOZE may be further configured to control whether or not the module 256 applies the blur effect to the tagged video frames 234a-234n. For example, when one of the identified people 252a-252n is detected, the processor 102 may activate the signal SNOOZE and the module 256 may apply the blur effect (or other distortion effect) in response to the signal SNOOZE. The signal SNOOZE may be configured to determine when the module 256 applies the blur effect and the metadata tags 254a-254n may determine where the module 256 applies the blur effect. Generating the distortion effect when the signal SNOOZE is active may enable the encoded video frames 240a-240n to be generated while still protecting the privacy of the identified people 252a-252n.

The processor 102 may be configured to generate the encoded video frames 240a-240n from the pixel data received from the capture devices 104a-104n. The processor 102 may be configured to determine when the notification should be suppressed and/or when the generation of the encoded video frames 240a-240n should be modified. The video frames may be tagged with the metadata tags 254a-254n in response to the objects/events detected by the CNN module 190b. The scheduler circuit 190a may load a directed acyclic graph (DAG) comprising parameters for detecting various types of objects/events and/or identities. For example, different DAGs may be loaded in response to the types of events of interest and/or particular identities selected by the user. The signal FEAT_SET may comprise parameters for video (e.g., pet detection, types of pets, behavior, number of people in an area, locations of particular items, identifying particular individuals, etc.). The signal FEAT_SET may further comprise parameters for audio (e.g., a maximum audio level, particular frequencies to detect, particular vocal signatures to detect, times of day that particular audio levels are to be detected, etc.). Generally, the processor 102 may compare the characteristics detected in the video frames 230a-230n with the events and/or objects of interest and/or the identities defined by the user by using the parameters defined by the feature set information. The information provided in the feature set information may be varied according to the design criteria of a particular implementation.

Figure 5:
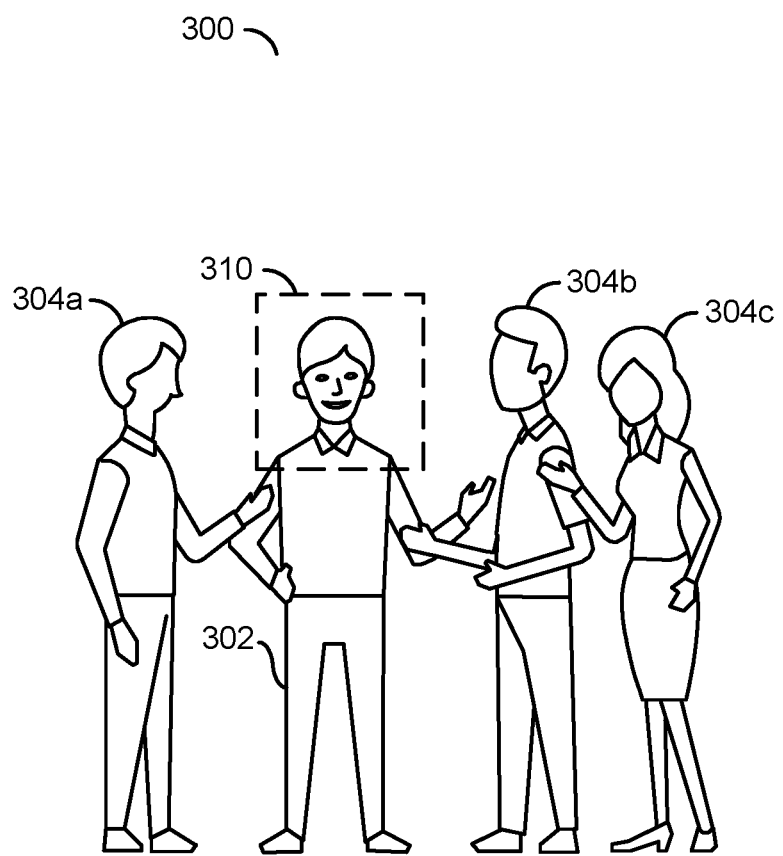
FIG. 5 is a diagram illustrating detecting a particular person in an example video frame.

Referring to FIG. 5, a diagram illustrating detecting a particular person in an example video frame is shown. For example, the example video frame 300 may be a representative example of one of the video frames 230a-230n. The example video frame 300 may capture an area within a field of view captured by the camera systems 100a-100n shown in association with FIG. 1.

The example video frame 300 may comprise objects that may be detected by the processor 102 (e.g., a person 302 and people 304a-304c). The example video frame 300 may comprise a person 302 that may be one of the identified people 252a-252n (e.g., one of the pre-determined people). The person 302 may be a target person in the video frame 300. For example, while the target person 302 may be one of the identified people 252a-252n, the processor 102 may not have performed sufficient analysis yet to make the determination. For example, after detecting the target person 302, additional computer vision operations may be performed to verify whether the target person 302 is one of the identified people 252a-252n. In one example, the location of the target person 302 may be determined in response to analyzing an audio source (e.g., detected by the microphones 154a-154n). In another example, the location of the target person 302 may be determined in response to a detection by the sensors 152 (e.g., a proximity sensor). In yet another example, the location of the target person 302 may be determined in response to computer vision operations (e.g., detecting a shape of a person generally as an initial level of detection to determine X,Y pixel co-ordinates of the target person 302 within the video frame 300 before the target person 302 is identified).

An area of interest (e.g., region of interest (ROI)) 310 is shown. In the example shown, the area of interest 310 may be located around a face of the target person 302. For example, when the processor 102 is configured to perform facial recognition/identification operations to detect the identified people 252a-252n, the ROI 310 may be located around the face. In some embodiments, the processor 102 may perform person identification. For person identification, the ROI 310 may be located around one or more body parts of the target person 302 in order to analyze the entire person.

Using the information from the directional microphones 154a-154n (e.g., the signal DIR_AUD), location information from a proximity sensor and/or computer vision operations, the processor 102 may determine the direction of the target person 302. The processor 102 may translate the directional information from the directional microphones 154a-154n to a corresponding location in the video frames 230a-230n. In one example, the area of interest 310 may be the location of the audio source translated to the video frame 300.

Once the direction of the target person 302 has been identified, the processor 102 may perform the computer vision operations on the area of interest 310. In one example, the processor 102 may be configured to crop out the area 310 of the video image capturing the face (or other body parts) of the target person 302. The processor 102 may then perform various video operations to increase resolution and zoom in on the area of interest 310. The video operations may improve a likelihood of success when performing facial recognition.

In some embodiments, the video frame 300 may be a 360-degree video frame (e.g., the camera system 100 may capture a 360-degree field of view). In a 360-degree field of view video frame, all the people 304a-304c and other people (e.g., located behind the apparatus 100) would be in the captured video frame 300. Similarly, the directional audio DIR_AUD may be analyzed by the processor 102 to determine the corresponding location of the audio source as the target person 302 in the video frame 300.

In the example video frame 300, multiple faces may be captured. In the example shown, the faces of the people 304a-304c may be captured along with the face of the target person 302. In the case where multiple faces are captured, the face recognition implemented by the processor 102 may be further extended to determine whether any of the target person 302 and the other people 304a-304c are one of the identified people 252a-252n.

In some embodiments, audio analysis may be used to determine whether the target person 302 and/or one of the other people 304a-304c are one of the identified people 252a-252n. For example, the processor 102 may determine that the target person 302 is speaking and the people 304a-304c are not speaking. In one example, the processor 102 may be configured to monitor mouth movements in the captured video frames. The mouth movements may be determined using the computer vision. In some embodiments, the mouth movements may be combined (e.g., compared) with voice data being received. The processor 102 may decide which of the people 304a-304c and the target person 302 is speaking. For example, the processor 102 may determine which mouth movements align to the detected speech in the audio signal DIR_AUD. The processor 102 may be configured to perform sensor fusion operations to compare results of the computer vision operations (e.g., facial recognition and/or person recognition) and the audio analytics (e.g., voice recognition) to determine whether the person speaking is one of the identified people 252a-252n.

The processor 102 may be configured to analyze the directional audio signal DIR_AUD to determine the location of the audio source (e.g., the person 302). In some embodiments, the location determined from the directional audio signal DIR_AUD may comprise a direction (e.g., a measurement in degrees from a center of one or more of the lenses 150a-150n, a coordinate in a horizontal direction, etc.). In some embodiments, the location determined from the directional audio signal DIR_AUD may comprise multiple coordinates. For example, the location determined by the processor 102 may comprise a horizontal coordinate and a vertical coordinate from a center of one of the lenses 150*a*-150*n*. In another example, the location determined by the processor 102 may comprise a measurement of degrees (or radians) of a polar angle and an azimuth angle. In yet another example, the location determined from the directional audio signal DIR_AUD may further comprise a depth coordinate. In the example shown, the location of the area of interest 310 may comprise at least a horizontal and vertical coordinate (e.g., the area of interest 310 is shown at face-level).

Figure 6:
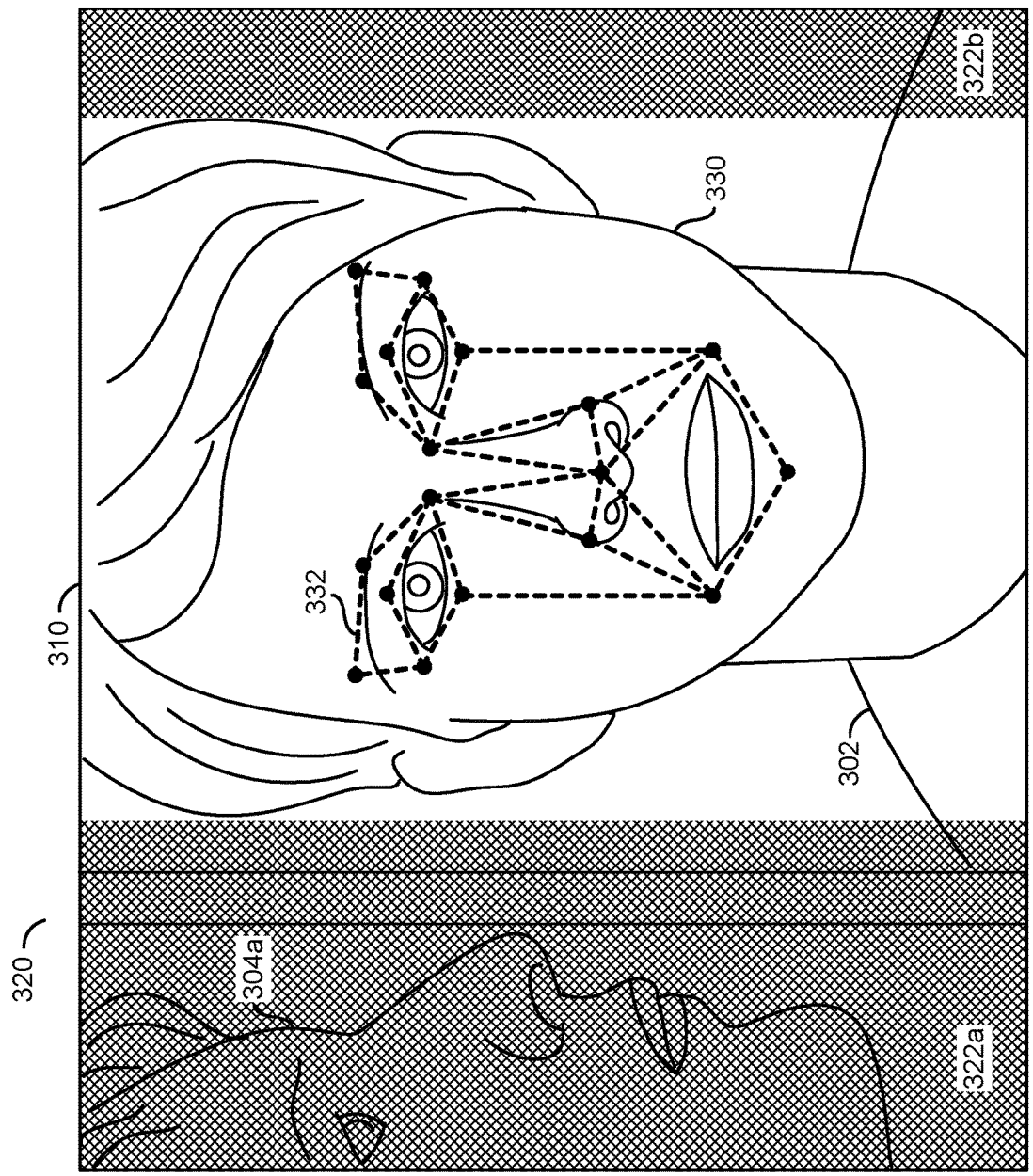
FIG. 6 is a diagram illustrating performing computer video operations on an example video frame to recognize a person.

Referring to FIG. 6, a diagram illustrating performing computer video operations on an example video frame to recognize a person is shown. The processor 102 may be configured to perform video operations on the example video frame 300 and/or the area of interest 310 shown in association with FIG. 5. In the example shown, an example video frame portion 320 may comprise the area of interest 310 and two areas 322*a*-322*b* adjacent to the area of interest 310. Similarly, there may be areas above and below the area of interest 310.

One of the video operations performed by the processor 102 may be a cropping operation. The cropping operation of the processor 102 may remove (e.g., delete, trim, etc.) one or more portions of the video frame 300. For example, the cropping operation may remove all portions of the video frame 300 except for the area of interest 310. In the example shown, the areas 322*a*-322*b* may be the cropped off portions of the video frame 300 (e.g., shown for illustrative purposes but not analyzed by the CNN module 190*b*). In the example shown, the person 304*a* may be in the cropped area 322*a*. The cropping operation may remove the person 304*a*.

The face 330 of the target person 302 is shown within the area of interest 310. The image sensors 182*a*-182*n* may implement a high-resolution image sensor. Using the high resolution image sensors 182*a*-182*n*, the processor 102 may combine over-sampling of the image sensors 182*a*-182*n* with digital zooming within the cropped area 310. The over-sampling and digital zooming may each be one of the video operations performed by the processor 102. The over-sampling and digital zooming may be implemented to deliver higher resolution images within the total size constraints of the cropped area 310.

In some embodiments, one or more of the lenses 150*a*-150*n* may implement a fisheye lens. One of the video operations implemented by the processor 102 may be a dewarping operation. The processor 102 may be configured to dewarp the window of interest 310. The dewarping may be configured to reduce and/or remove acute distortion caused by the fisheye lens and/or other lens characteristics. For example, the dewarping may reduce and/or eliminate a bulging effect to provide a rectilinear image.

A higher resolution image of the window of interest 310 may be generated in response to the video operations performed by the processor 102. The higher resolution image may enable the facial recognition computer vision to work with greater precision. The processor 102 may be configured to implement the facial recognition computer vision. The facial recognition computer vision may be one of the computer vision operations performed by the processor 102.

Facial recognition operations 332 are shown on the face 330 of the target person 302 in the area of interest 310. The facial recognition operations 332 may be an illustrative example of various measurements and/or relationships between portions of the face 330 calculated by the processor 102. The facial recognition operations 332 may be used to identify the target person 302 as a specific (e.g., unique) individual and/or basic descriptive characteristics (e.g., tattoos, hair color, eye color, piercings, face shape, skin color, etc.). The facial recognition operations 332 may provide an output of the various measurements and/or relationships between the portions of the face 330.

The output of the facial recognition operations 332 may be used to compare against a database of known faces (e.g., the identified people 252*a*-252*n*). The data about the known faces in the identities database 232 may comprise various measurements and/or relationships between the portions of faces in a format compatible with the output of the facial recognition operations 332. In some embodiments, the output of the facial recognition operations 332 may be configured to provide descriptions of an intruder (e.g., for law enforcement).

The facial recognition operations 332 may be used by the processor 102 to determine whether the target person 302 in the video frames 230*a*-230*n* is one of the identified people 252*a*-252*n*. If the results of the facial recognition operations 332 match (e.g., match within a pre-determined confidence range), then the processor 102 may determine that one of the identified people 252*a*-252*n* is in the video frames 230*a*-230*n*. The CNN module 190*b* may apply the metadata tags 254*a*-254*n* to generate the tagged video frames 234*a*-234*n*. The CNN module 190*b* may adjust the status of the signal SNOOZE to enable the processor 102 to appropriately react to the presence or lack of presence of one of the identified people 252*a*-252*n* (e.g., suppress/enable notifications, stop/start recording video, apply a distortion effect to the face 330, etc.).

Figure 7:
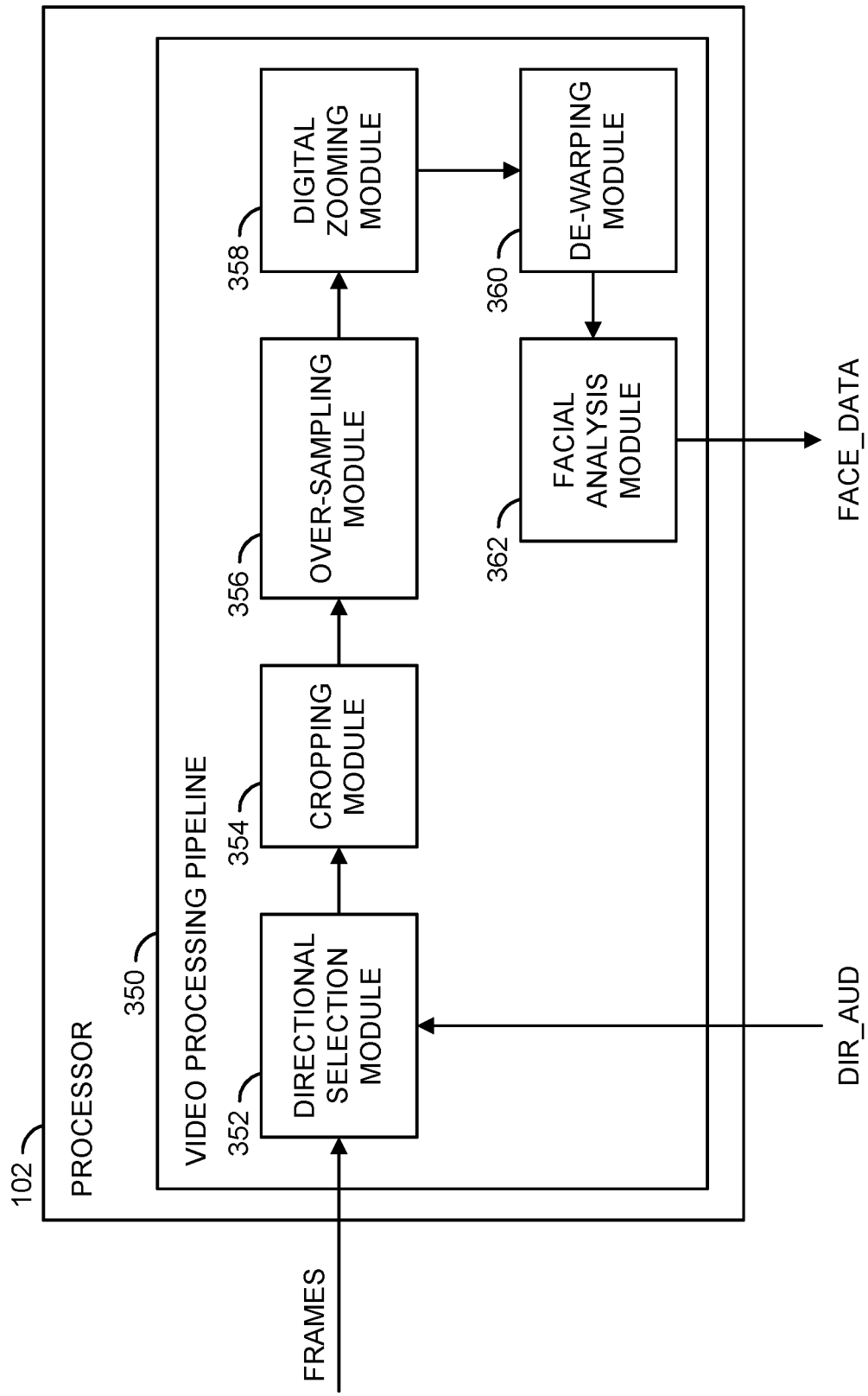
FIG. 7 is a block diagram illustrating an example video pipeline configured to perform face recognition operations.

Referring to FIG. 7, a block diagram illustrating an example video pipeline configured to perform face recognition operations is shown. The processor 102 may comprise a block (or circuit) 350. The circuit 350 may implement a video processing pipeline. The video processing pipeline may be configured to perform the various video operations implemented by the processor 102. The processor 102 may comprise other components (not shown). The number, type and/or arrangement of the components of the processor 102 may be varied according to the design criteria of a particular implementation.

The video processing pipeline 350 may be configured to receive an input signal (e.g., FRAMES) and/or an input signal (e.g., the signal DIR_AUD). The video processing pipeline may be configured to present an output signal (e.g., FACE_DATA). The video processing pipeline 350 may be configured to receive and/or generate other additional signals (not shown). The number, type and/or function of the signals received and/or generated by the video processing pipeline may be varied according to the design criteria of a particular implementation.

The video pipeline 350 may be configured to encode video frames captured by each of the capture devices 104*a*-104*n*. The video processing pipeline 350 shown may represent a portion of the modules, features and/or capabilities of the video processing pipeline 350. The video processing pipeline 350 may be implemented by programming one or more of the hardware modules 190*a*-190*n* shown in association with FIG. 3.

The video processing pipeline 350 may comprise a block (or circuit) 352, a block (or circuit) 354, a block (or circuit) 356, a block (or circuit) 358, a block (or circuit) 360 and/or a block (or circuit) 362. The circuit 352 may implement a directional selection module. The circuit 354 may implement a cropping module. The circuit 356 may implement an over-sampling module. The circuit 358 may implement a digital zooming module. The circuit 360 may implement a dewarping module. The circuit 362 may implement a facial analysis module. The video processing pipeline 350 may comprise other components (not shown). The number, type, function and/or arrangement of the components of the video processing pipeline 350 may be varied according to the design criteria of a particular implementation.

The circuits 352-362 may be conceptual blocks representing the video operations performed by the processor 102. In an example, the circuits 352-362 may share various resources and/or components. The order of the circuits 352-362 may be varied and/or may be changed in real-time (e.g., video data being processed through the video processing pipeline may not necessarily move from the circuit 352, to the circuit 354, then to the circuit 356, etc.). In some embodiments, one or more of the circuits 352-362 may operate in parallel.

The directional selection module 352 may be configured to receive the signal FRAMES (e.g., one or more of the video frames 230a-230n) generated in response to the pixel data captured by one or more of the capture devices 104a-104n. The directional selection module 352 may be configured to receive signal DIR_AUD from the directional microphones 154a-154n. The directional selection module 352 may be configured to extract the location of the target person 302 based on the directional audio signal DIR_AUD. The directional selection module 352 may be configured to translate the information in the directional audio signal DIR_AUD to a location (e.g., coordinates) of the input video frames (e.g., the signal FRAMES). Based on the location, the directional selection module 352 may select the area of interest 310. In one example, the area of interest 310 may comprise Cartesian coordinates (e.g., an X, Y, and Z coordinate) and/or spherical polar coordinates (e.g., a radial distance, a polar angle and an azimuth angle). The format of the selected area of interest 310 generated by the direction selection module 352 may be varied according to the design criteria of a particular implementation.

The cropping module 354 may be configured to crop (e.g., trim to) the region of interest 310 from the full video frame 300 (e.g., generate the region of interest video frame). The cropping module 354 may receive the signal FRAMES and the selected area of interest information from the directional selection module 354. The cropping module 354 may use the coordinates of the area of interest to determine the portion of the video frame to crop. The cropped region may be the area of interest 310.

In an example, cropping the region of interest 310 selected may generate a second image. The cropped image (e.g., the region of interest video frame 310) may be smaller than the original video frame 300 (e.g., the cropped image may be a portion of the captured video). The area of interest 310 may be dynamically adjusted based on the location of the target person 302 determined by the directional selection module 352. For example, the detected target person 302 may be moving, and the location of the detected audio source may move as the video frames are captured. The directional selection module 352 may update the selected region of interest coordinates and the cropping module 354 may dynamically update the cropped section 310 (e.g., the directional microphones 154a-154n may dynamically update the location based on the directional audio captured). In another example, the computer vision operations and/or data from the sensors 152 may be used to dynamically update the location of the cropped section 310.

The cropped section may correspond to the area of interest selected. As the area of interest changes, the cropped portion 310 may change. For example, the selected coordinates for the area of interest 310 may change from frame to frame, and the cropping module 354 may be configured to crop the selected region 310 in each frame. For each of the video frames 230a-230n, the cropping module 354 may be configured to crop different coordinates, based on the location information determined from the signal DIR_AUD.

The over-sampling module 356 may be configured to over-sample the image sensors 182a-182n. The over-sampling of the image sensors 182a-182n may result in a higher resolution image. The higher resolution images generated by the over-sampling module 356 may be within total size constraints of the cropped region.

The digital zooming module 358 may be configured to digitally zoom into an area of a video frame. The digital zooming module 358 may digitally zoom into the cropped area of interest 310. For example, the directional selection module 352 may establish the area of interest 310 based on the directional audio (or computer vision or sensor data), the cropping module 354 may crop the area of interest 310, and then the digital zooming module 358 may digitally zoom into the cropped region of interest video frame. In some embodiments, the amount of zooming performed by the digital zooming module 358 may be a user selected option.

The dewarping operations performed by the hardware dewarping module 360 may adjust the visual content of the video data. The adjustments performed by the dewarping module 360 may cause the visual content to appear natural (e.g., appear as seen by a person viewing the location corresponding to the field of view of the capture devices 104a-104n). In an example, the dewarping module 360 may alter the video data to generate a rectilinear video frame (e.g., correct artifacts caused by the lens characteristics of the lenses 150a-150n). The dewarping operations performed by the hardware dewarping module 360 may be implemented to correct the distortion caused by the lenses 150a-150n. The adjusted visual content may be presented by the dewarping module 360 to enable more accurate and/or reliable facial detection.

Implementing the dewarping module 360 as a hardware module may increase the video processing speed of the processor 102. The hardware implementation of the dewarping module 360 may dewarp the area of interest 310 faster than a software implementation. The hardware implementation of the dewarping module 360 may enable the video to be processed while reducing an amount of delay. For example, with the hardware implementation, the audio detected may be associated with the location of the target person 302 in near real-time (e.g., low lag). The hardware implementation of the dewarping module 360 may implement the various calculations used to dewarp the area of interest 310 using hardware components. The hardware components used may be varied according to the design criteria of a particular implementation.

The facial analysis module 362 may be configured to perform the facial analysis operations 332. For example, the facial analysis module 362 may be configured to perform the measurements and/or comparisons of the facial features of the face 330 of the target person 302 in the selected window of interest 310. Generally, the video operations performed by the circuits 352-360 may be implemented to facilitate an accurate and/or reliable detection of the facial features 332. For example, a high-resolution and dewarped area of interest 310 may reduce potential errors compared to a video frame that has warping present and/or a low resolution video frame. Cropping the input video frames to the area of interest 310 may reduce an amount of time and/or processing to perform the facial detection compared to performing the facial detection operations on a full video frame.

The facial analysis module 362 may be configured to generate the signal FACE_DATA. The signal FACE_DATA may comprise the facial information extracted from the area of interest 310 using the facial analysis operations 332. The data in the extracted information FACE_DATA may be compared against the database of facial information 232 to find a match for the identity of the target person 302. In some embodiments, the facial analysis module 362 may be configured to perform the comparisons of the detected facial information with the stored facial information 252a-252n.

In some embodiments, the components 352-362 of the video processing pipeline 350 may be implemented as discrete hardware modules. In some embodiments, the components 352-362 of the video processing pipeline 350 may be implemented as one or more shared hardware modules. In some embodiments, the components 352-362 of the video processing pipeline 350 may be implemented as software functions performed by the processor 102.

Figure 8:
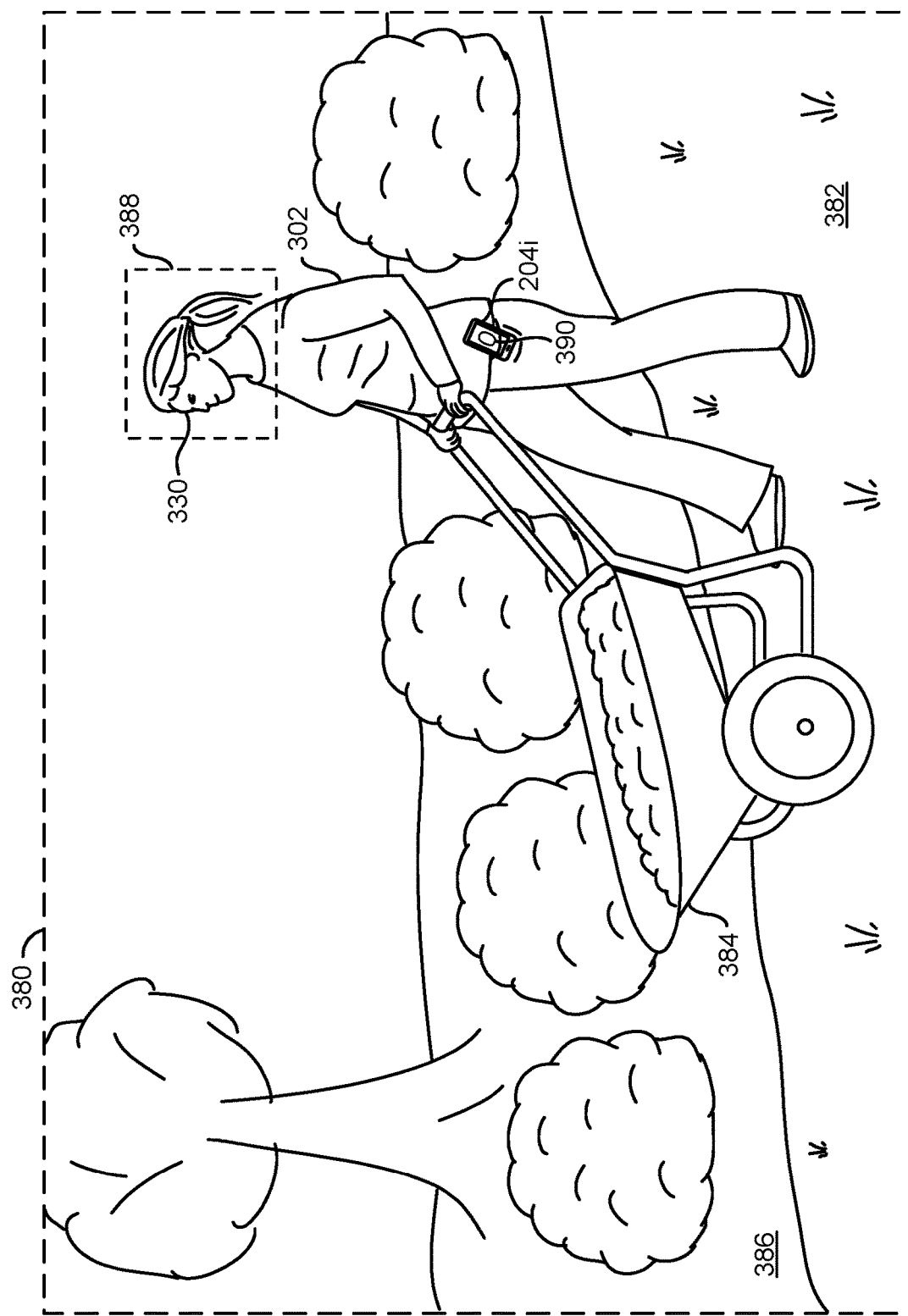
FIG. 8 is a diagram illustrating suppressing notifications in response to detecting a pre-determined person.

Referring to FIG. 8, a diagram illustrating suppressing notifications in response to detecting a pre-determined person is shown. An example video frame 380 is shown. The example video frame 380 may be an illustrative example of the video data and/or pixel data in the video frames 230a-230n. The example video frame 380 may comprise pixel data provided to the CNN module 190b. The CNN module 190b may be configured to analyze the pixel data of the video frames 230a-230n to determine whether one or more of the identified people 252a-252n are present. The particular identities 252a-252n detected by the CNN module 190b may be selected by the user and/or defined by the feature set 220 loaded by the processor 102.

The example video frame 380 may be a video captured near the home 50 (e.g., a view from the perspective one of the cameras 100a-100n). The example video frame 380 may comprise the remote device 204i, the target person 302, the face 330, a yard 382, a wheelbarrow 384 and/or a garden 386. In the example video frame 380, the homeowner may be performing yard work. Receiving one of the notifications NTF_A-NTF_N in response to one of the cameras 100a-100n detecting the target person 302 may be an annoyance (e.g., the homeowner may not want notifications about the homeowner being detected in the yard).

A dotted shape 388 is shown. The dotted shape 388 may represent the detection of an object by the computer vision operations performed by the processor 102. The dotted shape 388 may comprise the pixel data corresponding to an object detected by the computer vision operations pipeline and/or the CNN module 190b. The dotted shape 388 is shown for illustrative purposes. In an example, the dotted shape 388 may be a visual representation of the object detection (e.g., the dotted shape 388 may not appear on an output video frame sent to the remote devices 204a-204n and/or the cloud service 202). In another example, the dotted shape 388 may be a bounding box generated by the processor 102 displayed on the output video frames to indicate that an object has been detected (e.g., the bounding box 388 may be displayed in a debug mode of operation).

The computer vision operations may be configured to detect characteristics of the detected objects and/or behavior of the objects detected. The characteristics of the objects may comprise a height, length, width, slope, an arc length, a color, an amount of light emitted, detected text on the object, a path of movement, a speed of movement, a direction of movement, etc. The characteristics of the detected object may comprise a status of the object (e.g., opened, closed, on, off, etc.). The behavior may be determined in response to the type of object and/or the characteristics of the objects detected. While one example video frame 380 is shown, the behavior of an object may be determined by analyzing a sequence of video frames captured over time. For example, a path of movement and/or speed of movement characteristic may be used to determine that an object classified as a person may be walking or running. The types of characteristics and/or behaviors detected may be varied according to the design criteria of a particular implementation.

In the example shown, the bounding box 388 may be the face/head 330 of the target person 302 (e.g., the homeowner). In an example, the settings (e.g., the feature set) for the processor 102 may define objects of interest to be people, vehicles and/or animals. For example, a tree may not be objects of interest (e.g., detecting generally static objects may result in continually detecting events). In another example, detecting the homeowner 302 may result in implementing the smart snooze of notifications, but detecting a particular action/behavior by the homeowner 302 may be considered an event for sending the notification (e.g., the homeowner 302 has fallen down or stopped moving, which may indicate a medical emergency). For example, particular events detected (e.g., potential medical emergencies, a potential crime, a fire, etc.) may override the smart snooze of notifications (e.g., notifications may be sent even during the smart snooze mode of operation).

The processor 102 may be configured to compare the detected object 388 (e.g., the detected face 330) with the identified people 252a-252n. When the object 388 matches one of the identified people 252a-252n, the CNN module 190b may apply the metadata tags 254a-254n to the video frames 230a-230n. The metadata tags 254a-254n may indicate which of the identified people 252a-252n has been detected, where in the video data the detected object 388 has been located, information about other objects detected, etc. In the example shown, the metadata tags 254a-254n may indicate that the homeowner has been detected, and that the location of the object 388 may be at a particular X,Y pixel coordinate (e.g., a coordinate generally in the top right of the video frame 380). When the object 388 matches one of the identified people 252a-252n, the CNN module 190b may assert the signal SNOOZE. When the object 388 does not match one of the identified people 252a-252n, the CNN module 190b may apply metadata tags 254a-254n to the video frames 230a-230n. For example, the metadata tags 254a-254n may indicate which objects have been detected (e.g., trees, animals, an unidentified person, etc.).

The example video frame 380 may be tagged in response to the CNN module 190b detecting objects and/or events. For example, the detection of the person 302, the detection of the wheelbarrow 384 and/or the detection of other objects may each generate a metadata tag. Other data, such as a timestamp and/or locations of the bounding boxes for detected objects may be part of the metadata tagged for the video frame 380. The metadata may comprise multiple tags (e.g., one metadata tag for detecting the homeowner 302, another metadata tag for detecting the wheelbarrow 384, another metadata tag for the behavior of performing yardwork, etc.). The number of metadata tags and/or the type of data stored with the metadata may be varied according to the design criteria of a particular implementation.

Various functionality of the processor 102 may respond to the assertion and/or deassertion of the signal SNOOZE. In one example, the generation of the notification signals NTF_A-NTF_N may be suppressed in response to the signal SNOOZE. In another example, the recording (e.g., storage) of the encoded video frames 240a-240n may be stopped in response to the signal SNOOZE. When the signal SNOOZE is de-asserted (e.g., when the homeowner 302 is no longer present in the video frame 380), then the notification signals NTF_A-NTF_N (and/or the recording) may be enabled.

In the example shown, the remote device 204i may be a smartphone. The smartphone 204i is shown carried by the homeowner 302. A display of the smartphone 204i is shown. The display of the smartphone 204i may comprise a notification indicator 390. The notification indicator 390 is shown as a zero. The notification indicator 390 may illustrate that the camera systems 100a-100n have not generated a notification in response to the detection of the homeowner 302. The smart snooze mode of operation may have been activated in response to detecting the homeowner 302 and the notifications generated may be zero because the smart snooze mode of operation suppressed any notifications corresponding to the detection of the homeowner 302.

Figure 9:
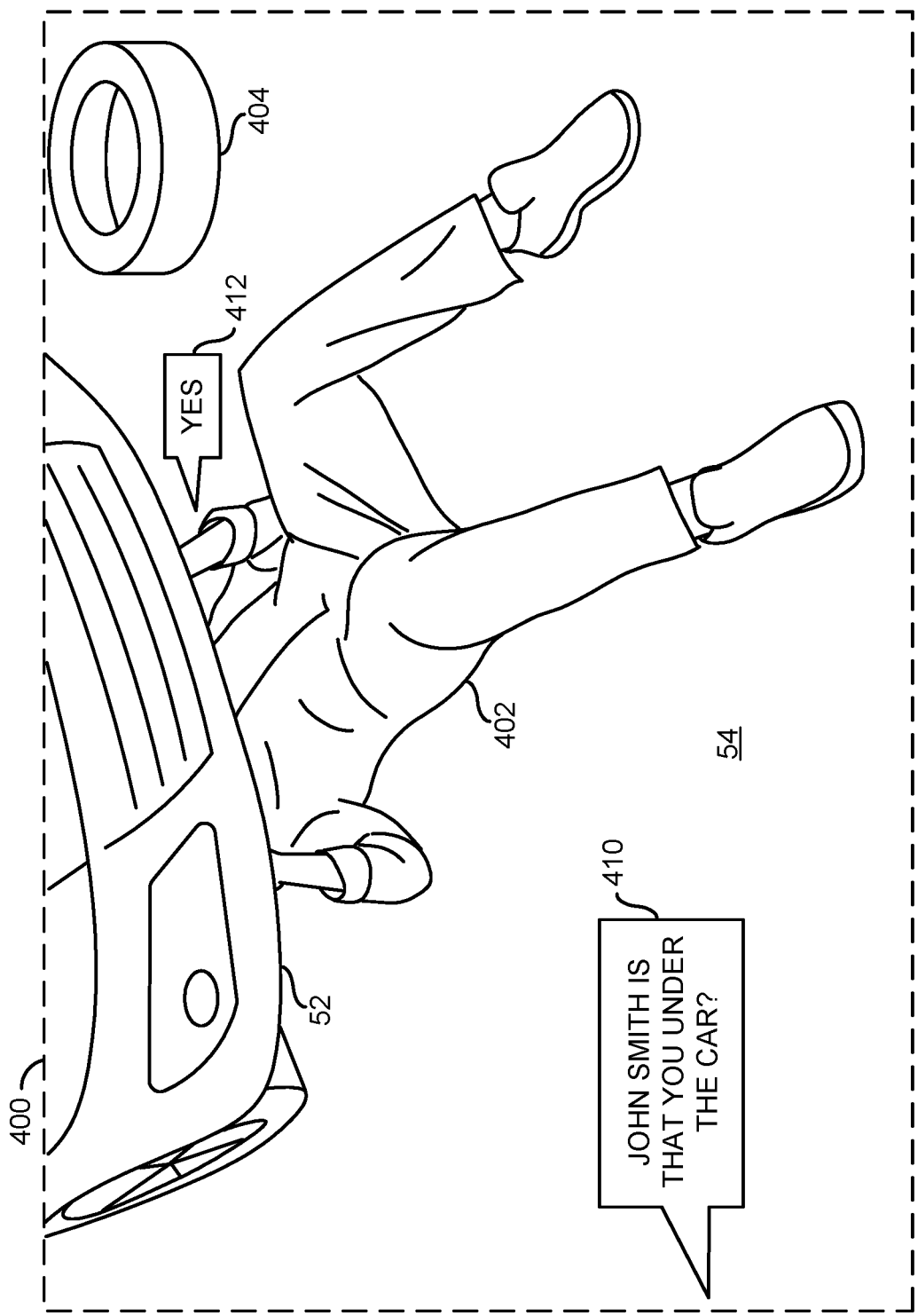
FIG. 9 is a diagram illustrating performing audio analysis to identify a person partially detected in an example video frame.

Referring to FIG. 9, a diagram illustrating performing audio analysis to identify a person partially detected in an example video frame is shown. An example video frame 400 is shown. The example video frame 400 may be an illustrative example of the video data and/or pixel data in the video frames 230a-230n. The example video frame 400 may comprise pixel data provided to the CNN module 190b. The CNN module 190b may be configured to analyze the pixel data of the video frames 230a-230n to determine whether one or more of the identified people 252a-252n are present.

The example video frame 400 may represent a field of view captured by the camera system 100e shown in association with FIG. 1. The field of view shown in the example video frame 400 may comprise the garage interior 54. For example, the camera system 100e may be one of the cameras 100a-100n directed at the interior of the home 50. A portion of the vehicle 52 is shown in the video frame 400. The video frame 400 may further comprise a person 402 and a tire 404.

In the example video frame 400, the person 402 may be working under the vehicle 52. The person 402 is shown partially concealed by the vehicle 52. The face of the person 402 may be hidden in the example video frame 400. For example, without the face of the person 402 being visible, the facial recognition operations may not be performed successfully (e.g., the computer vision operations alone may be unable to identify the person 402). In the example scenario shown in the video frame 400, the person 402 may not be able to be identified as one of the identified people 252a-252n.

Speech bubbles 410-412 are shown. The speech bubble 410 may represent audio generated by the camera system 100e. For example, the audio represented by the speech bubble 410 may be generated by the speakers 158a-158n (e.g., the signals AOUT_A-AOUT_N). The speech bubble 412 may represent audio generated by the person 402. For example, the audio represented by the speech bubble 412 may be received by the directional microphones 154a-154n (e.g., the signals AIN_A-AIN_N that may be converted to the signal DIR_AUD).

The processor 102 may be configured to select particular statements and/or questions for the generated audio 410 (e.g., an audio question). The generated audio 410 may be configured to elicit a response from the person 402. The generated audio 410 may generally ask the person 402 to confirm an identity.

In one example, the memory 160 may store various pre-recorded audio clips of questions to use as the generated audio 410. In another example, the processor 102 may be configured to procedurally generate statements and/or questions as the generated audio 410. In some embodiments, the generated audio 410 may be framed as a yes/no question (e.g., to make analysis of the signal DIR_AUD easier than analyzing a full response). In some embodiments, the generated audio 410 may comprise a generic question to ask for an identity (e.g., "Who are you?" or "Please state your name."). In some embodiments, the generated audio 410 may be selected based on the computer vision operations and/or other inferences made. In one example, the computer vision operations may partially determine the identity of the person 402 based on the video data (e.g., based on the characteristics of the body parts visible). In the example shown, the generated audio 410 may be "John Smith is that you under the car?". For example, the computer vision operations may detect a body type similar to the identity for the person named John Smith. In another example, the inference may be made based on locations of particular people. For example, if John Smith is the only person in the identities database 232, then the generated audio 410 may ask for John Smith. In yet another example, other of the camera systems 100a-100n may detect other family members, and the camera system 100e may infer that the person 402 would likely be John Smith (e.g., the only remaining family member that has not yet been identified). The method of selecting the generated audio 410 may be varied according to the design criteria of a particular implementation.

The processor 102 (e.g., the audio analysis module 190c) may be configured to perform audio analytics on the audio response 412. The audio analytics may be configured to interpret the response (e.g., speech recognition). In the example shown, the audio response 412 may be "Yes." The processor 102 may be configured to compare the words interpreted from the audio response 412, with the questions presented as the generated audio 410. For example, the processor 102 may be configured determine that the audio response 412 of "Yes" confirms that the person is John Smith as asked in the generated audio 410. In another example, the generated audio 410 may be "Please state your name" and the speech recognition performed by the audio analysis module 190c on the audio response 412 may determine the name and the name may be compared to the names of the identified people 252a-252n. In some embodiments, the audio analytics may be configured to analyze the frequency and/or other characteristics of the audio response 412. For example, the frequency and/or other characteristics of the audio response 412 may be compared to corresponding characteristics about the voices stored as part of the identified people 252a-252n.

In some embodiments, the processor 102 may generate a confidence level for the identity determined for the person 402. The confidence level may indicate how likely that the processor 102 has correctly determined the identity of the person 402. In an example, an unclear audio response 412 (e.g., distorted audio received, ambiguous reply received, etc.) may result in a lower confidence level. An exact match to a name and/or vocal characteristics may result in a higher confidence level. Other factors, such as the partial detection based on body characteristics using computer vision may affect the confidence level of the identification of the person 402. In some embodiments, the location of the cameras 100a-100n may affect the confidence level. For example, an interior location, such as the garage interior 54 may be more likely to capture video of the homeowner, and an outdoor location may be less likely to capture video of the homeowner. The confidence level may be used to determine whether the assert and/or de-assert the signal SNOOZE.

The processor 102 may be configured to monitor the person 402 over a sequence of video frames. For example, the person 402 may temporarily leave the field of view of the camera system 100e and return again. If the computer vision operations determine that the person 402 is the same person that was previously identified, then the audio response 410 may not need to be asked again (e.g., the previous identification may be re-used). In another example, computer vision results from earlier video frames may be used to make assumptions about the person 402. For example, the person 402 may be identified as the homeowner using computer vision results from analysis of video frames captured earlier than the example video frame 400. For example, the person 402 may be identified as the homeowner when walking into the garage interior 54. After being identified, the face of the homeowner may be later hidden under the vehicle 52. The previous identification of the homeowner may enable the signal SNOOZE. The signal SNOOZE may remain active when the face of the person 402 has been concealed based on the previous identification.

The processor 102 may be configured to perform person detection. The person detection implemented by the processor 102 may be configured to distinguish a person (e.g., the person 402) from various other objects detected (e.g., the tire 404). The feature set data FEAT_SET may comprise characteristics that may be used by the CNN module 190b in order to detect an object as a person even when one or more of the characteristics of a person (e.g., a face) is not visible in the video frame 400. For example, other characteristics may be detected such as arms, legs, a torso, feet, particular patterns of movement, etc.

The processor 102 may be configured to perform person identification. The person identification implemented by the processor 102 may be configured to recognize that a person detected in a current video frame is the same person (or a different person) as a person detected in a previously captured video frame. In an example, the person 402 may have been detected as a particular individual in a video frame captured prior to the video frame 400 (e.g., the face of the person 402 may have been visible before the person 402 went under the vehicle 52, and the facial recognition may have identified the person 402 as one of the identified people 252a-252n). By analyzing a sequence of video frames and/or monitoring a continuity of the objects in the video frame 400, the processor 102 may be configured to determine that the person 402 is the same person that walked into the field of view earlier. For example, the person 402 may have been detected walking into the field of view, and crawling under the vehicle 52. The continuity of the person 402 over a sequence of video frames may enable the processor 102 to determine that the person 402 is the same person that was identified before crawling under the vehicle 52.

The person identification may be configured to combine various characteristics of the person 402 to establish continuity. For example, the person 402 may enter the video frame 400, then leave the field of view and then later return to the field of view. Particular characteristics such as color of clothing, an identified face and/or movement patterns detected by the processor 102 may enable the person identification to determine that the person is the same person as previously detected over a sequence of video frames (e.g., whether a person detected in a video frame captured at an earlier time is the same person detected in a video frame captured at a later time). The types of characteristics used to establish continuity for the person identification may be varied according to the design criteria of a particular implementation.

In some embodiments, geofencing may be used to determine the identity of the person 402 when the face is concealed. For example, the person 402 may be carrying one of the remote devices 204a-204n. The detection of the person 402 in the video frame 400 along with a generally corresponding location determined from one of the remote devices 204a-204n may enable the processor 102 to identify the person 402 as one of the identified people 252a-252n. For example, the identifies database 232 may comprise a device ID for a particular one of the remote devices 204a-204n used by the person 402 for comparison.

In some embodiments, the signal SNOOZE may be applied for a pre-determined amount of time. For example, the generated audio 410 may repeat the question after the pre-determined amount of time for the signal SNOOZE (e.g., every half hour). The pre-determined amount of time for the signal SNOOZE may enable the processor 102 to check a health status of the person 402. For example, the person 402 may become unresponsive due to a medical emergency. Limiting the amount of time of the signal SNOOZE may enable the processor 102 to provide the generated audio 410. If no audio response 412 is received, other actions may be performed (e.g., contacting a family member, calling an ambulance, providing the generated audio 410 at a louder volume, etc.).

Figure 10:
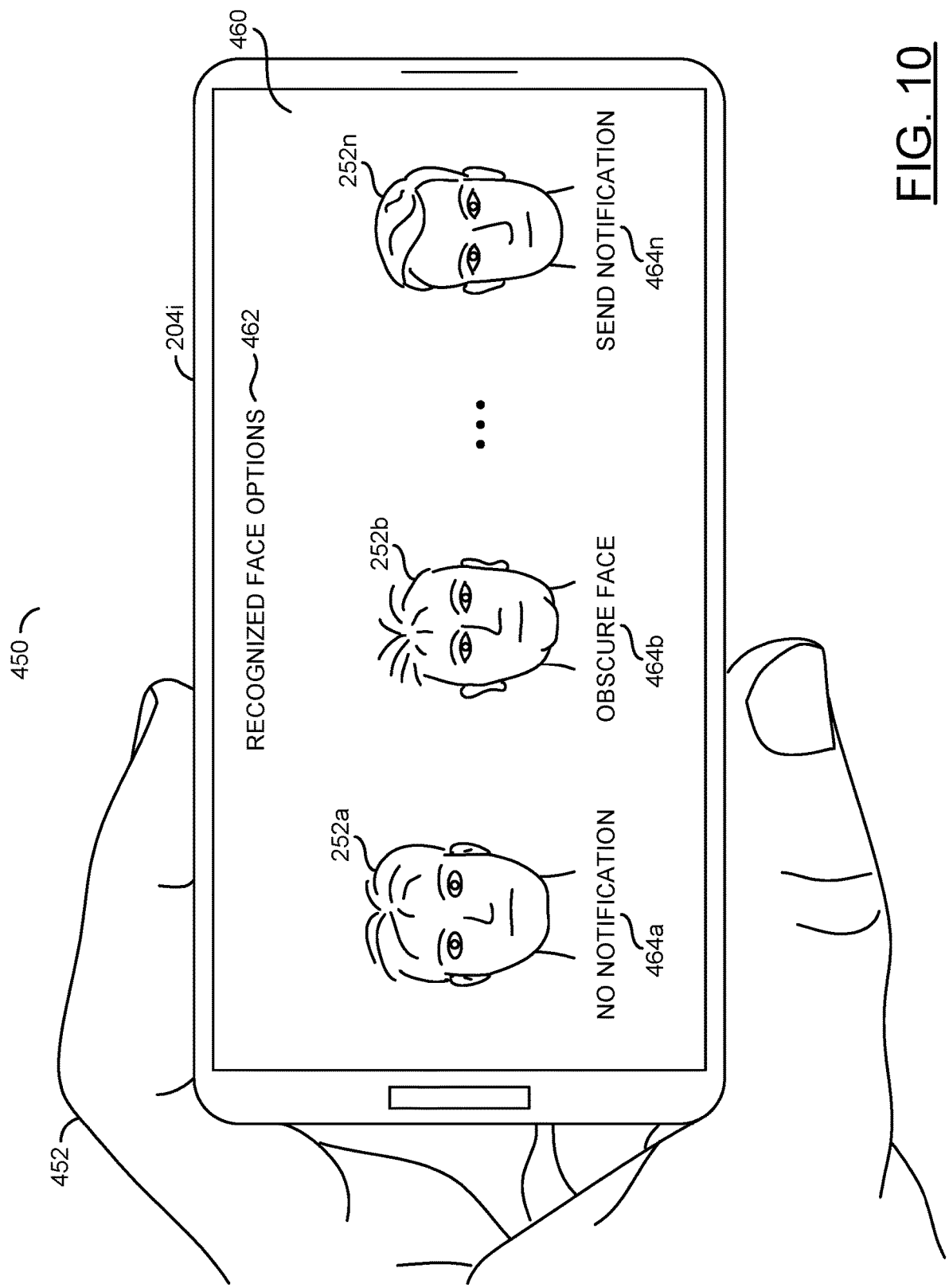
FIG. 10 is a diagram illustrating a companion application configured to enable a user to adjust notification settings for particular individuals.

Referring to FIG. 10, a diagram illustrating a companion application configured to enable a user to adjust notification settings for particular individuals is shown. An example scenario 450 is shown. In the example scenario 450, a user 452 is shown holding the remote device 204i. In the example shown, the remote device 204i may be a smartphone (e.g., a device comprising a touchscreen display, a processor, a wireless communication device, etc.).

An interface for an app 460 is shown. For example, the app 460 may be displayed on the touchscreen display of the smartphone 204i. The app 460 may be a companion app for the camera systems 100a-100n. In one example, the app 460 may be configured to enable the smartphone 204i to connect directly to one or more of the camera systems 100a-100n. In another example, the app 460 may be configured to enable the smartphone 204i to connect to the event settings 210 and/or the mass video storage 212 of the cloud service 202 to enable the user 452 to control the camera systems 100a-100n. The camera systems 100a-100n may be configured to operate according to the event settings 210 retrieved from the cloud service 202.

The app 460 may comprise recognized face options 462. The recognized face options 462 may be one available feature provided by the app 460. The app 460 may comprise other features (not shown). For example, the app 460 may enable the user 452 to view the encoded video frames 240a-240n (e.g., watch a live stream), receive the notifications NTF_A-NTF_N, adjust video settings (e.g., framerate, resolution, night vision, etc.), select which types of objects to detect, download video data from the mass video storage 212, etc. The features and/or settings accessible using the app 460 may be varied according to the design criteria of a particular implementation.

The recognized face options 462 of the app 460 may display the identified people 252a-252n. In the example shown, the identified people 252a-252n may comprise the faces of particular individuals (e.g., members of the household, employees, friends, etc.). In some embodiments, the identified people 252a-252n may comprise various body characteristics (e.g., body type, height, age, etc.). The user 452 may upload images (e.g., digital photos) of faces of particular people using the app 460. In one example, the faces may be uploaded to the cloud service 202 in order to generate the feature set 220. In another example, the faces may be uploaded directly to the camera systems 100a-100n (e.g., using a local connection) to ensure that potentially private information of the particular people is not provided to other networks and/or devices (e.g., the cloud service 202).

In the example shown, the faces displayed for the identified people 252a-252n may comprise front-views of the face. In some embodiments, additional angles of the faces (or body) may be provided to enable the feature set 220 to be used to detect the identified people 252a-252n from various camera angles. In the example shown in association with FIG. 8, a profile view of the person 302 is shown. The identified people 252a-252n may further comprise a profile view image of faces.

Respective permission status 464a-464n are shown corresponding to the identified people 252a-252n. The permission status 464a-464n may be configured to enable the processor 102 to determine an appropriate response to detecting a particular one of the identified people 252a-252n. Each of the identified people 252a-252n may have a distinct one of the permission status 464a-464n selected. In some embodiments, the permission status 464a-464n for each of the identified people 252a-252n may be the same setting. The permission status 464a-464n may affect the response of the processor 102 when the signal SNOOZE is activated.

In the example shown, the permission status 464a selected for the identified person 252a may be 'no notification'. The 'no notification' permission status 464a may be selected to suppress the notifications NTF_A-NTF_N while the identified person 252a is detected by one of the camera systems 100a-100n. In the example shown, the permission status 464b selected for the identified person 252b may be 'obscure face'. The 'obscure face' permission status 464b may be selected to enable the module 256 to apply a blur effect for the encoded video frames 240a-240n at the location of the face in video data. In the example shown, the permission status 464n selected for the identified person 252n may be 'send notification'. The 'send notification' permission status 464n may be selected to enable the notifications NTF_A-NTF_N when the identified person 252n is detected by one of the camera systems 100a-100n. In an example, the 'send notification' permission status 464n may over-ride any 'no notification' permission status if more than one of the identified people 252a-252n are detected (e.g., the user 452 may want notifications if a known criminal is detected, the user 452 may want a notification every time a child returns home from school, the user 452 may want a notification of when a delivery person arrived, etc.). In another example, one of the permission status 464a-464n may comprise a disable recording, an enable recording, an alarm, etc. In yet another example one of the permission status 464a-464n may comprise temporarily disabling the computer vision operations for a selected amount of time. The computer vision operations may be disabled (e.g., to protect privacy by not generating data in the metadata tags 254a-254n). The computer vision operations may be resumed after the pre-determined amount of time to periodically check for the presence of the identified people 252a-252n (e.g., and disabled again when the signal SNOOZE is asserted if one of the identified people 252a-252n is still detected). The number and/or types of permission status 464a-464n available may be varied according to the design criteria of a particular implementation.

The app 460 may enable the user 452 to apply the permission status 464a-464n to the respective identified people 252a-252n. In one example, the available permission status 464a-464n may be selected using a pre-populated drop down menu. In another example, the available permission status 464a-464n may be selected using radio buttons. In yet another example, the permission status 464a-464n may be selected using a drag and drop interface. The method of applying one of the available permission status options to the identified people 252a-252n may be varied according to the design criteria of a particular implementation.

Figure 11:
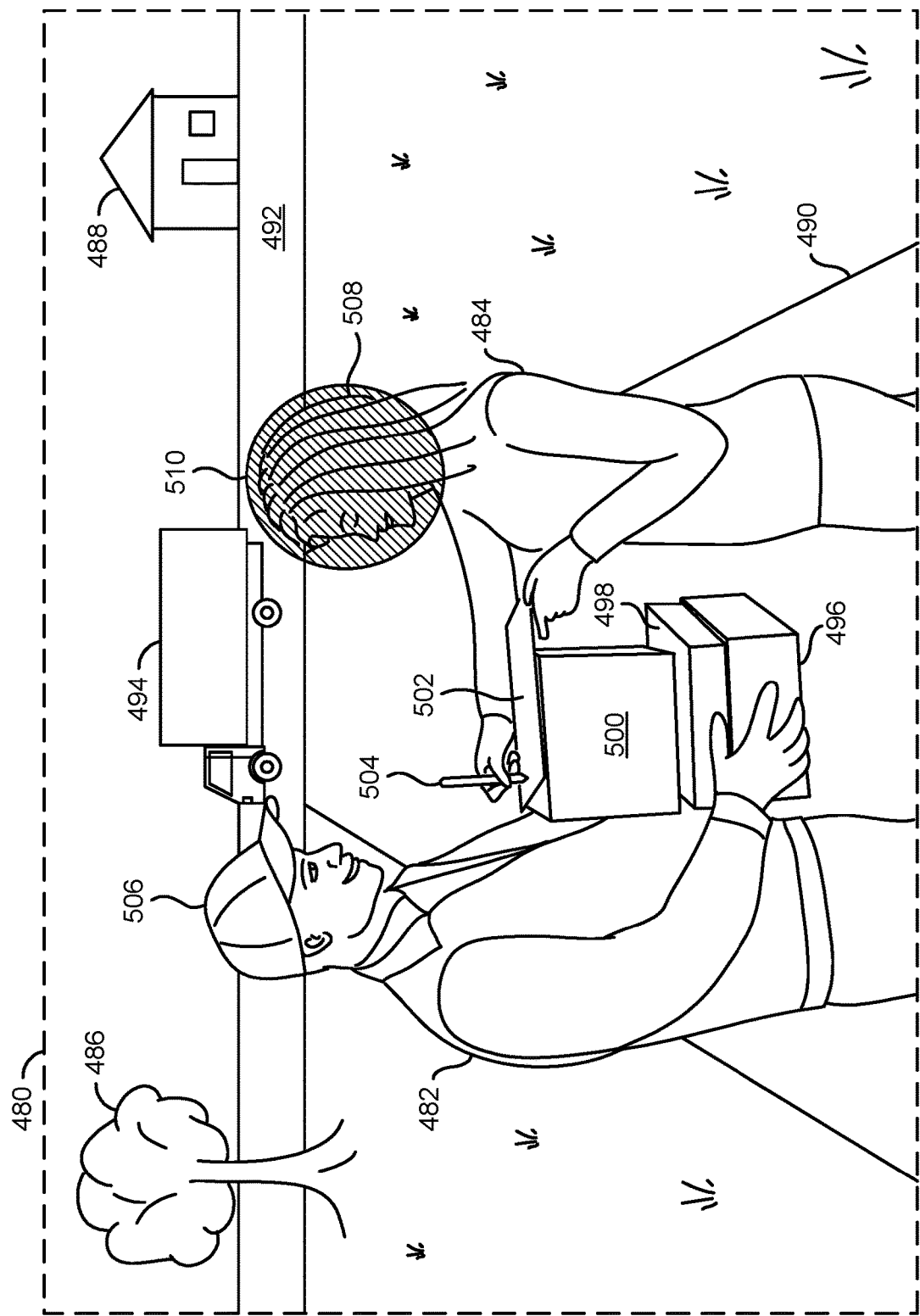
FIG. 11 is a diagram illustrating a privacy effect applied to a captured video frame.

Referring to FIG. 11, a diagram illustrating a privacy effect applied to a captured video frame is shown. An example video frame 480 is shown. The example video frame 480 may be an illustrative example of the video data and/or pixel data in the video frames 230a-230n. The example video frame 480 may comprise pixel data provided to the CNN module 190b. The CNN module 190b may be configured to analyze the pixel data of the video frames 230a-230n to determine whether the event and/or person of interest is present. The types of objects/events detected by the CNN module 190b may be selected by the user and/or defined by the feature set 220 loaded by the processor 102.

The example video frame 480 may be a video captured of a front of the home 50 (e.g., a view from the perspective of the front door directed down the driveway). The example video frame 480 may comprise a delivery person 482, and a homeowner 484 signing for a package delivered by the delivery person 482. The example video frame 480 may further comprise a tree 486, a house 488, a driveway 490, a road 492, a delivery truck 494, a package 496, a package 498, a package 500, a document 502, a pen 504, a head/face 506 and/or a head/face 508. The delivery truck 494 may be parked on the road 492. The homeowner 484 may be accepting delivery of the package 500 by signing the document 502.

In the example shown, the computer vision operations may detect various objects. For example, the CNN module 190b may be configured to detect each of the delivery person 482, the homeowner 484, the tree 486, the house 488, the driveway 490, the road 492, the delivery truck 494, the package 496, the package 498, the package 500, the document 502, the pen 504, the head/face 506, the head/face 508 and/or other objects. Each of the objects detected may be listed in the metadata tags 254a-254n. One or more of the objects detected may result in the processor 102 generating the notifications NTF_A-NTF_N based on the settings selected using the app 460. In an example, the settings (e.g., the feature set) for the processor 102 may define objects of interest to be people and vehicles. For example, the tree 486 and the home 488 may not be objects of interest (e.g., detecting generally static objects may result in continually detecting events). In another example, detecting the homeowner 484 may result in the signal SNOOZE being asserted, which may suppress the notifications NTF_A-NTF_N and/or prevent recording the video data, but detecting a particular action/behavior by the homeowner 484 may be considered an event (e.g., the behavior of the person 484 signing the document 502 for the package 500 may be considered a CV event detection) and the video data may still be recorded with the distortion effect applied.

Other types of CV events may be detected. In an example, an amount of movement may be a CV event. For example, slight movement of the tree 486 may not be a CV event, but the user 452 may want to view video when the weather is very windy and significant movement of the tree 486 may be defined as an event. In another example, the delivery truck 494 on the road 492 may not be considered an event (e.g., to avoid notifications each time a car drives by), but when the delivery truck 494 is on the driveway 490, the CV event may be detected. The types of objects, movements, events that may be considered CV events may be varied according to the design criteria of a particular implementation. The processor 102 may be configured to generate the notifications NTF_A-NTF_N in response to the events detected.

The example video frame 480 may be tagged in response to the CNN module 190b detecting objects and/or events. For example, the detection of the homeowner 484, the detection of the delivery person 482 and/or the detection of the delivery truck 494 may each generate a metadata tag. Other data, such as a timestamp and/or locations of the bounding boxes corresponding to the object detection may be part of the metadata tagged for the video frame 480. The metadata may comprise multiple tags (e.g., one metadata tag for detecting the homeowner 484, another metadata tag for detecting the delivery person 482, another metadata tag for the behavior of signing the document 502, another metadata tag for detecting the packages 496-500, etc.). The number of metadata tags and/or the type of data stored with the metadata may be varied according to the design criteria of a particular implementation.

The example video frame 480 may comprise a scenario where an event of interest is detected along with one of the identified people 252a-252n being detected. For example, the detection of the delivery person 482 may be one event that may generally result in the signals NTF_A-NTF_N being generated and/or the encoded video frames 240a-240n being recorded. However, the detection of the homeowner 484 may result in the assertion of the signal SNOOZE. For example, the user 452 may want a notification and/or video evidence of the delivery of the packages 496-500 even though the video frame 480 comprises one of the identified people 252a-252n, but may also want the privacy of the homeowner 484 to be protected.

A shape 510 is shown. The shape 510 may have a shaded pattern. The shaded shape 510 may be an illustrative example of the distortion effect.

The module 254 may apply the distortion effect 510 to protect the privacy of the homeowner 484. The distortion effect 510 is shown around the face 508 of the homeowner 484. In the example shown, the distortion effect 510 may be shown for illustrative purposes (e.g., the face 508 of the homeowner 484 is still shown). However, when the distortion effect 510 is applied the face 508 of the homeowner 484 may be entirely obscured. The module 254 may be configured to modify the video frames 234a-234n in response to the permission status 464a-464n corresponding to the people detected.

The processor 102 may be configured to determine the location of the face 508 (or other body parts) of the homeowner 484 (or other of the identified people 252a-252n). The location of the face 508 may be determined as an area defined by X and Y coordinates (e.g., a region of pixels). The distortion effect 510 may be applied to the region of pixels corresponding to the face 508 (or other body parts). The distortion effect 510 may be applied to conceal the identity of the homeowner 484 without blocking and/or obscuring the rest of the video data. For example, the distortion effect 510 may not reduce the visibility of the delivery person 482, the delivery truck 494, the house 488, the tree 486, etc. The distortion effect 510 may protect the privacy of the homeowner 484 (e.g., the pre-defined identity), while enabling the other objects and/or events of interest to be visible.

In the example shown, the distortion effect 510 may have a circular shape. In some embodiments, the distortion effect 510 may be intelligently selected to have a shape that corresponds to the shape of the body part and/or face that may obscured. For example, the processor 102 may be configured to identify the shape of the face 508 based on the characteristics of the pixels (e.g., an arrangement of similar colors) to determine the shape for the distortion effect 510. In another example, the processor 102 may be configured to apply the distortion effect 510 to a randomly selected area around the face 508 (or other body parts) to help conceal identifying features of the homeowner 484 (e.g., conceal a body shape or clothes worn that might be used to identify the homeowner 484). In one example, the distortion effect 510 may be a mask (e.g., a colored overlay on top of the face of the identified people 252a-252n). In another example, the distortion effect 510 may be a blur effect. In yet another example, the distortion effect 510 may be a mosaic effect. In still another example, the distortion effect 510 may comprise cropping and/or removing pixels (e.g., replacing with null data or random data). In yet another example, the distortion effect 510 may comprise replacing the face 508 with an alternate graphic. The type of the distortion effect 510 applied may be varied according to the design criteria of a particular implementation.

In some embodiments, the computer vision operations may be configured to detect a particular activity performed by the identified people 252a-252n to determine whether the response to the SNOOZE signal may be to suppress the notification signals NTF_A-NTF_N, to apply the distortion effect 510 and/or to stop recording. For example, one or more of the identified people 252a-252n may not want video of themselves performing an embarrassing activity. For example, for one activity, the response to the signal SNOOZE may be to record the video frames 240a-240n and suppress the notifications, for another activity, the response to the signal SNOOZE may be to apply the distortion effect 510 and for yet another activity the response to the signal SNOOZE may be to stop recording the video data. In some embodiments, the memory 160 may operate as a buffer for the encoded video frames 240a-240n. The buffer may temporarily store the encoded video frames 240a-240n for a pre-determined amount of time (e.g., half an hour, an hour, a day, etc.). The buffer may enable the user 452 to review the encoded video frames 240a-240n before the signal ENC_VIDEO is sent to the cloud service 202. The user 452 may delete recordings from the buffer before the encoded video frames 240a-240n are uploaded to another device.

Figure 12:
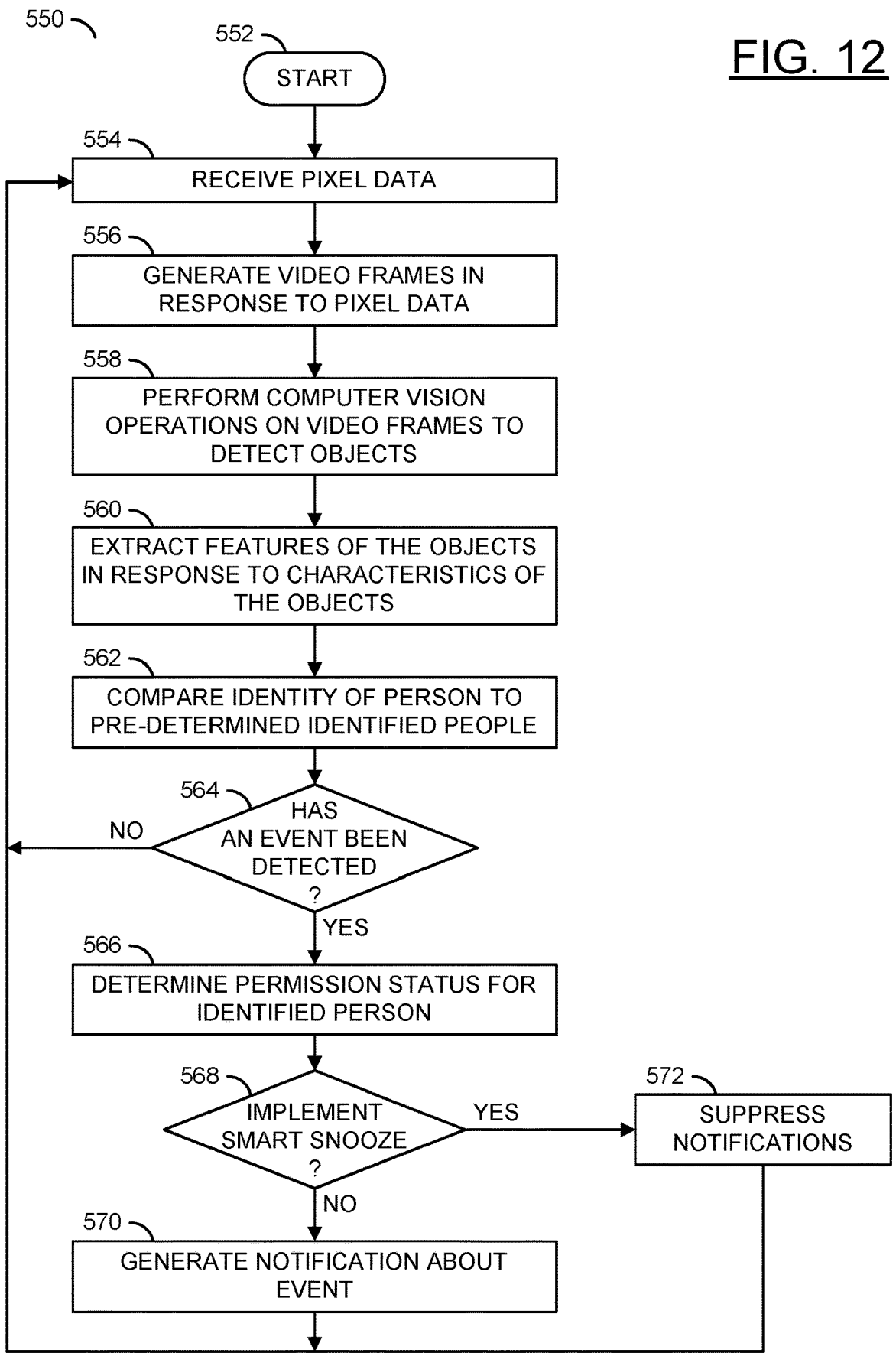
FIG. 12 is a flow diagram illustrating a method for implementing a smart snooze to disable notifications using computer vision analysis.

Referring to FIG. 12, a method (or process) 550 is shown. The method 550 may implement a smart snooze to disable notifications using computer vision analysis. The method 550 generally comprises a step (or state) 552, a step (or state) 554, a step (or state) 556, a step (or state) 558, a step (or state) 560, a step (or state) 562, a decision step (or state) 564, a step (or state) 566, a decision step (or state) 568, a step (or state) 570, and a step (or state) 572.

The step 552 may start the method 550. In the step 554, the processor 102 may receive pixel data. In an example, the processor 102 may receive the signals PIXELD_A-PIXELD_N generated by the one or more capture devices 104a-104n. Next, in the step 556, the processor 102 may generate video frames in response to the pixel data. For example, the hardware modules 190a-190n may be configured to convert the signals PIXELD_A-PIXELD_N to the signal FRAMES for use internally by the processor 102. In the step 558, the CNN module 190b may perform the computer vision operations on the video frames 230a-230n to detect objects and/or events. In the step 560, the CNN module 190*b* may extract features of the objects detected in response to the characteristics of the objects detected. In an example, the features extracted may be determined in response to the feature set 220. Next, in the step 562, the CNN module 190*b* may compare a detected identity (e.g., an identity determined based on the characteristics extracted) to the pre-determined identified people. For example, the detected characteristics of the objects detected may be compared to the identified people 252*a*-252*n*. Next, the method 550 may move to the decision step 564.

In the decision step 564, the CNN module 190*b* may determine whether an event has been detected. In an example, the event may be the detection of particular types of sounds (e.g., determined based on audio analysis) and/or particular types of objects (e.g., detecting a person). The tagged video frames 234*a*-234*n* may be generated comprising the metadata 254*a*-254*n* indicating the type and/or location of the events detected in each video frame. If no event has been detected, then the method 550 may return to the step 554. If an event has been detected, then the method 550 may move to the step 566. In the step 566, the processor 102 may determine the permission status for the identified person. The permission status 464*a*-464*n* may be stored with the identified people storage 252*a*-252*n*. Next, the method 550 may move to the decision step 568.

In the decision step 568, the processor 102 may determine whether to implement the smart snooze. For example, the smart snooze may be selected in response to the permission status 464*a*-464*n* corresponding to the person detected. In an example, if a non-person event is detected (e.g., a car accident is detected, an animal is detected, etc.) then there may be no permission status that indicates that smart snooze should be enabled. In another example, if the person detected is not one of the identified people 252*a*-252*n* then the smart snooze may not be selected (e.g., a notification should be generated). In yet another example, if the person detected is one of the identified people 252*a*-252*n* and the permission status 464*a*-464*n* indicates that the smart snooze should be enabled, then the processor 102 may change the mode of operation. If the smart snooze is not implemented, then the method 550 may move to the step 570. In the step 570, the apparatus 100 may operate in the default mode of operation and generate a notification (or perform another response such as upload the video to the mass video storage 212). Next, the method 550 may return to the step 554. In the decision step 568, if the smart snooze is implemented, then the method 550 may move to the step 572. In the step 572, the processor 102 may operate in the smart snooze mode of operation and suppress notifications. Next, the method 550 may return to the step 554.

Figure 13:
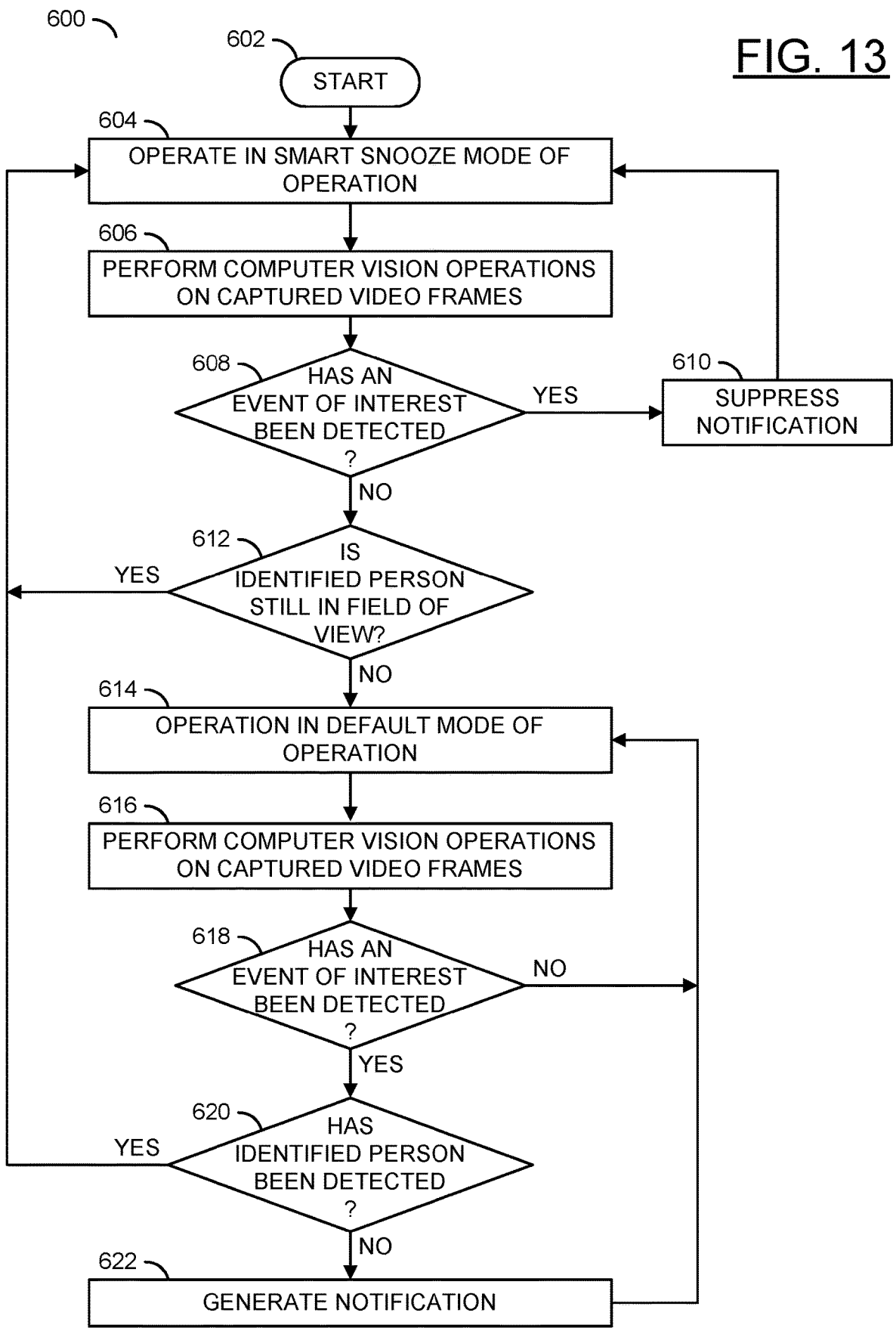
FIG. 13 is a flow diagram illustrating a method for switching between a smart snooze mode of operation and a normal mode of operation.

Referring to FIG. 13, a method (or process) 600 is shown. The method 600 may switch between a smart snooze mode of operation and a normal mode of operation. The method 600 generally comprises a step (or state) 602, a step (or state) 604, a step (or state) 606, a decision step (or state) 608, a step (or state) 610, a decision step (or state) 612, a step (or state) 614, a step (or state) 616, a decision step (or state) 618, a decision step (or state) 620, and a step (or state) 622.

The step 602 may start the method 600. In the step 604, the processor 102 may operate in the smart snooze mode of operation (e.g., the signal SNOOZE may be asserted). For example, one of the identified people 252*a*-252*n* may have been previously detected with the permission status 464*a*-464*n* indicating that the smart snooze mode of operation should be performed while the person remains detected. Next, in the step 606, the processor 102 may perform the computer vision operations on the video frames captured. Next, the method 600 may move to the decision step 608.

In the decision step 608, the processor 102 may determine whether an event of interest has been detected. The event of interest may be detected using computer vision analysis and/or audio analysis. If an event has been detected while in the smart snooze mode of operation, the method 600 may move to the step 610. In the step 610, the processor 102 may suppress notifications. Next, the method 600 may return to the step 604. In the decision step 608, if no event of interest has been detected, then the method 600 may move to the decision step 612. For example, not detecting an event of interest may indicate that the identified person 252*a*-252*n* has left the field of view of one of the capture devices 104*a*-104*n*.

In the decision step 610, the processor 102 may determine whether the identified person is still in the field of view of one of the capture devices 104*a*-104*n*. For example, the processor 102 may perform person detection to determine whether any objects detected in the video frames correspond to the same person that has the permission status 464*a*-464*n* indicating that the smart snooze mode should be enabled. If the identified person is still in the field of view, then the method 600 may return to the step 604. If the identified person is no longer in the field of view, then the method 600 may move to the step 614.

In the step 614, the processor 102 may change modes of operation to the default mode of operation (e.g., de-assert the signal SNOOZE to disable the smart snooze mode of operation). Next, in the step 616, the processor 102 may perform the computer vision operations on the video frames captured. Next, the method 600 may move to the decision step 618.

In the decision step 618, the processor 102 may determine whether an event of interest has been detected. The event of interest may be detected using computer vision analysis and/or audio analysis similar to the decision step 608. If an event has not been detected while in the default mode of operation, the method 600 may return to the step 614 (e.g., remain in the default mode of operations and perform computer vision operations to detect objects). If an event of interest has been detected while in the default mode of operation, then the method 600 may move to the decision step 620.

In the decision step 620, the processor 102 may determine whether one of the identified person 252*a*-252*n* is in the field of view of one of the capture devices 104*a*-104*n*. For example, the processor 102 may perform person detection and/or facial recognition to determine whether any objects detected in the video frames correspond to one of the identified people 252*a*-252*n* that has the permission status 464*a*-464*n* indicating that the smart snooze mode should be enabled. If the identified person is detected in the field of view, then the method 600 may return to the step 604 (e.g., change modes to the smart snooze mode of operation by asserting the signal SNOOZE). If the identified person is not detected in the field of view, then the method 600 may move to the step 622. In the step 622, the processor 102 may generate a notification (e.g., an indication of an event and/or what objects were detected as the event based on the metadata 254*a*-254*n*). Next, the method 600 may return to the step 614.

Figure 14:
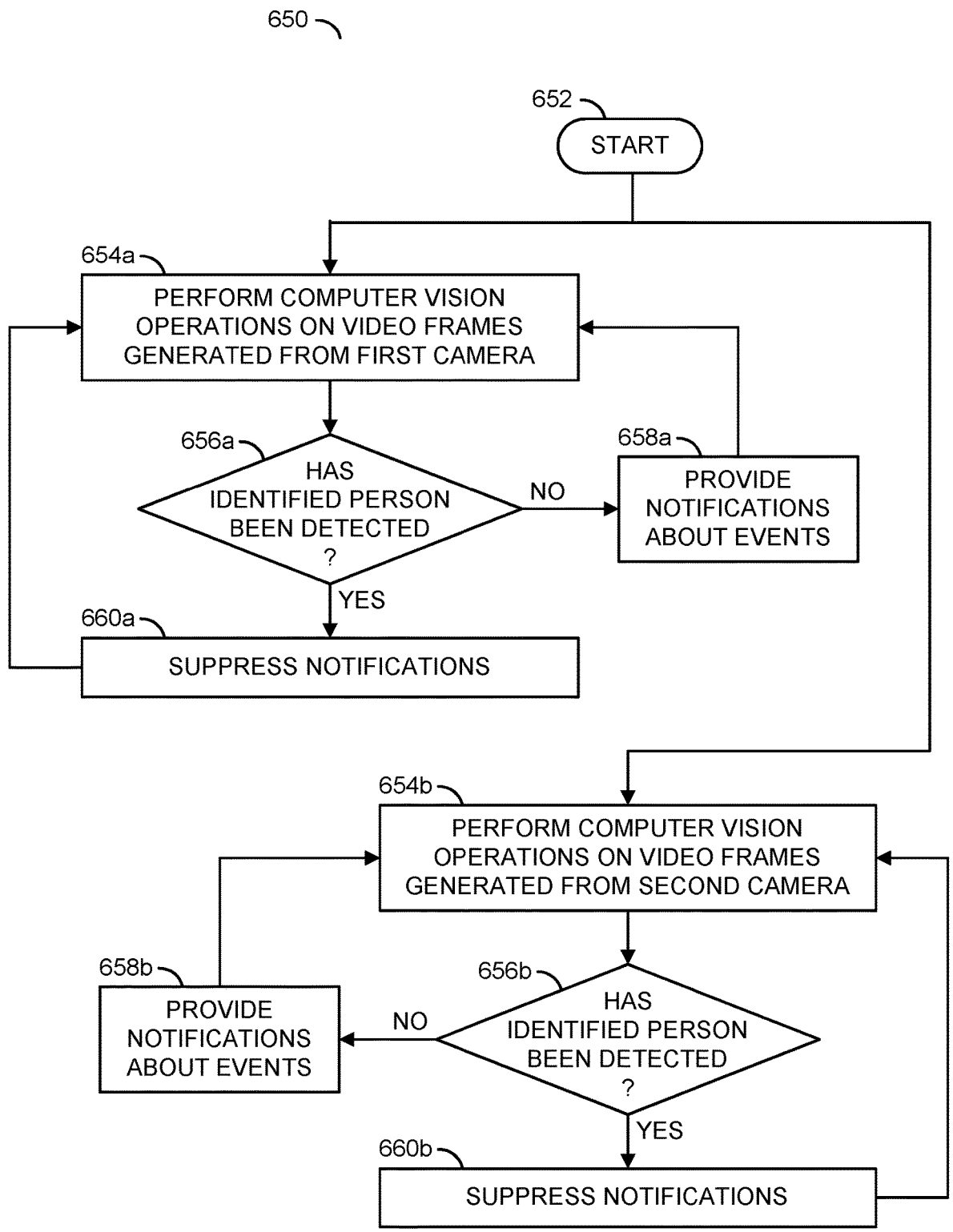
FIG. 14 is a flow diagram illustrating a method for suppressing notifications generated by one security camera without affecting notifications generated by another security camera.

Referring to FIG. 14, a method (or process) 650 is shown. The method 650 may suppress notifications generated by one security camera without affecting notifications generated by another security camera. The method 650 generally comprises a step (or state) 652, a step (or state) 654*a*, a step (or state) 654*b*, a decision step (or state) 656*a*, a decision step (or state) 656*b*, a step (or state) 658*a*, a step (or state) 658*b*, a step (or state) 660*a*, and a step (or state) 660*b*.

The step 652 may start the method 650. Next, the method 652 may move to the step 654*a* and the step 654*b*. In the example shown, the steps 654*a*-660*a* may be performed for one of the capture devices (e.g., the capture device 104*a*) in parallel (or substantially in parallel) with the steps 654*b*-660*b* performed for another one of the capture devices (e.g., the capture device 104*b*). While the steps 654-660 are shown for two of the capture devices 104*a*-104*n*, the processor 102 may be configured to perform similar operations in parallel for any number of connected capture devices 104*a*-104*n*.

In the step 654*a*, the processor 102 may perform the computer vision operations on the video frames generated from the pixel data PIXELD_A generated by the capture device 104*a*. In parallel, in the step 654*b*, the processor 102 may perform the computer vision operations on the video frames generated from the pixel data PIXELD_B generated by the capture device 104*b*. Next, the method 650 may move to the decision states 656*a*-656*b*.

In the decision state 656*a*, the processor 102 may determine whether one of the identified people 252*a*-252*n* with the permission status 464*a*-464*n* indicating the smart snooze mode of operation is in one of the video frames generated from the pixel data PIXELD_A. If no identified person with the permission status set to the smart snooze mode of operation is detected, then the method 650 may move to the step 658*a*. If an identified person with the permission status set to the smart snooze mode of operation is detected, then the method 650 may move to the step 660*a* (e.g., the signal SNOOZE may be asserted for the capture device 104*a*). Similarly, in parallel, in the decision step 656*b*, the processor 102 may determine whether one of the identified people 252*a*-252*n* with the permission status 464*a*-464*n* indicating the smart snooze mode of operation is in one of the video frames generated from the pixel data PIXELD_B. If no identified person with the permission status set to the smart snooze mode of operation is detected, then the method 650 may move to the step 658*b*. If an identified person with the permission status set to the smart snooze mode of operation is detected, then the method 650 may move to the step 660*b* (e.g., the signal SNOOZE may be asserted for the capture device 104*b*).

In the step 658*a*, the processor 102 may operate in the default mode of operations for events detected from the pixel data PIXELD_A and the processor 102 may generate notifications about the event detected. Next, the method 650 may return to the step 654*a*. Similarly, in parallel, in the step 658*b*, the processor 102 may operate in the default mode of operations for events detected from the pixel data PIXELD_B and the processor 102 may generate notifications about the event detected. Next, the method 650 may return to the step 654*b*.

In the step 660*a*, the processor 102 operate in the smart snooze mode of operations for events detected from the pixel data PIXELD_A and the processor 102 may suppress notifications about the event. Next, the method 650 may return to the step 654*a*. Similarly, in parallel, in the step 660*b* the processor 102 operate in the smart snooze mode of operations for events detected from the pixel data PIXELD_B and the processor 102 may suppress notifications about the event. Next, the method 650 may return to the step 654*b*.

The smart snooze mode of operation and the default mode of operations may be selected by the processor 102 independently for events detected from the pixel data captured by each of the capture devices 104*a*-104*n*. For example, the method 650 may operate in the step 658*a* (e.g., the default mode of operation) for the capture device 104*a*, while the method 650 also operates in the step 660*b* (e.g., the smart snooze mode of operation) for the capture device 104*b*. The detection of one of the identified people 252*a*-252*n* with the permission status 464*a*-464*n* that indicates the smart snooze mode of operation should be selected for one of the capture devices 104*a*-104*n* may not affect the mode of operation selected for another one of the capture devices 104*a*-104*n*. The permission status for a person detected in one set of video frames generated in response to one of the capture devices 104*a*-104*n* may not affect (e.g., suppress notification) the permission status for another person detected in another set of the video frames generated by another one of the capture devices 104*a*-104*n*. For example, the signal SNOOZE may be asserted for the capture device 104*a* while the signal SNOOZE is de-asserted for the capture device 104*b*. Which of the capture devices 104*a*-104*n* have the signal SNOOZE asserted may depend on the objects and/or events detected and/or the permission status 464*a*-464*n* for the people detected by each of the capture devices 104*a*-104*n*.

Figure 15:
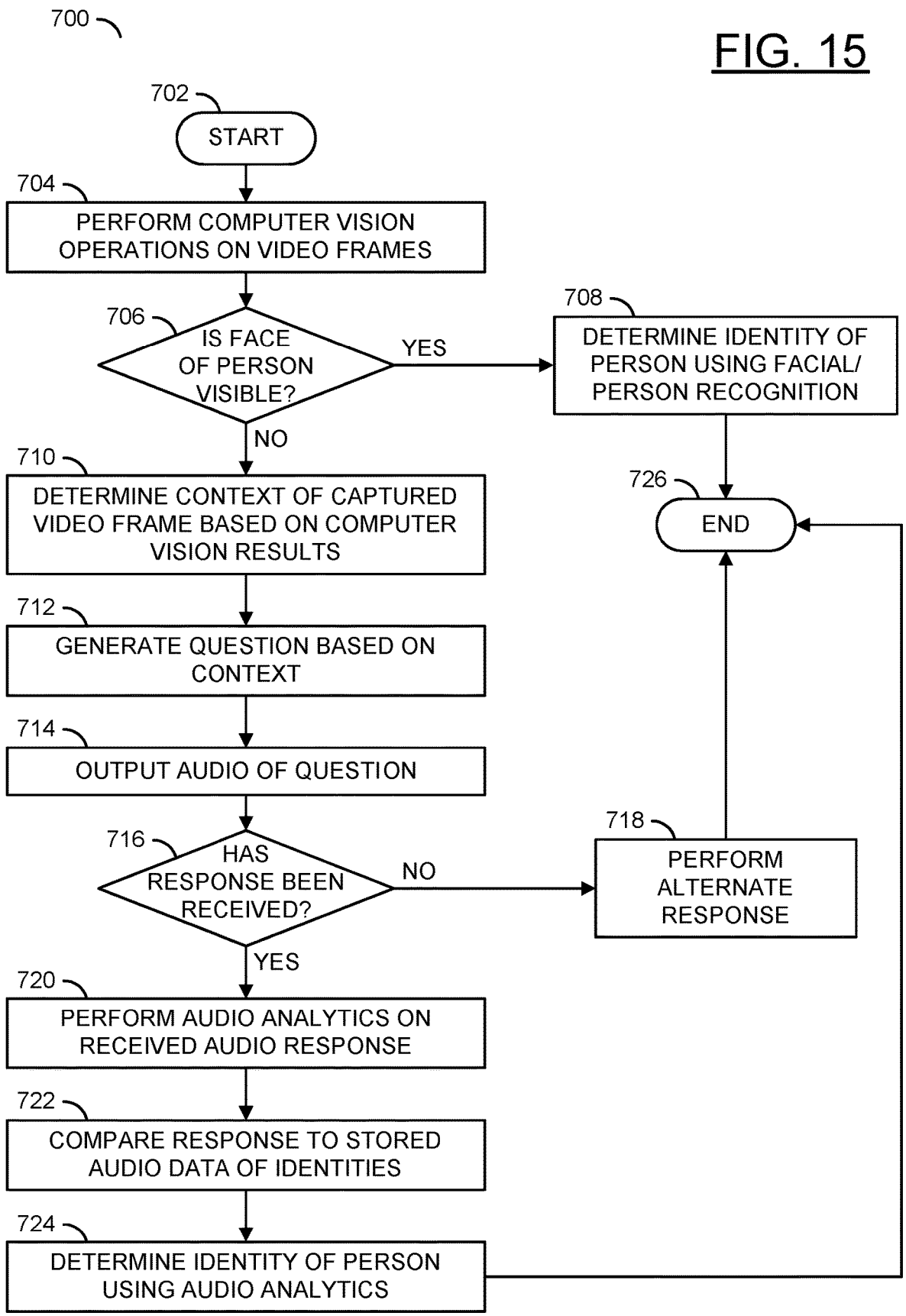
FIG. 15 is a flow diagram illustrating a method for determining an identity of a person using audio analytics.

Referring to FIG. 15, a method (or process) 700 is shown. The method 700 may determine an identity of a person using audio analytics. The method 700 generally comprises a step (or state) 702, a step (or state) 704, a decision step (or state) 706, a step (or state) 708, a step (or state) 710, a step (or state) 712, a step (or state) 714, a decision step (or state) 716, a step (or state) 718, a step (or state) 720, a step (or state) 722, a step (or state) 724, and a step (or state) 726.

The step 702 may start the method 700. Next, in the step 704, the processor 102 may perform the computer vision operations on the video frames. Next, the method 700 may move to the decision step 706.

In the decision step 706, the CNN module 190*b* may determine whether the face of a person is visible in the video frame. For example, a face of a person may be concealed, which may prevent facial recognition from being performed to identify the detected person. If the face is visible, then the method 700 may move to the step 708. In the step 708, the CNN module 190*b* may determine the identity of the person detected using facial recognition and/or person detection. Next, the method 700 may move to the step 726.

In the decision step 706, if the face of the person is not visible, then the method 700 may move to the step 710. In the step 710, the processor 102 may determine a context of the captured video frame based on the computer vision results. For example, the context may comprise other objects detected in the video frame and/or detecting the class of the object that may be concealing the face of the detected person. Next, in the step 712, the processor 102 may generate a question based on the context. For example, if the face is concealed by a curtain, then the question may ask for the person behind the curtain to state their name. In another example, if the face is concealed by a mask, then the question may ask the person to lift the mask or ask for the name of the person wearing a mark (or more specifically wearing a particular color or pattern of mask). In the step 714, the processor 102 may generate the audio output 410 of the question. Next, the method 700 may move to the decision step 716.

In the decision step 716, the processor 102 may determine whether the audio response 412 has been received. If the audio response 412 has not been received, then the method 700 may move to the step 718. In the step 718, the processor 102 may perform an alternate response. In one example, the alternate response may be to generate the audio output 410 to ask an alternate question (e.g., the first question may be 'John Smith, is that you under the vehicle?' and the alternate question may be 'Can you please identify yourself?'). In another example, the alternate response may be to generate the notification (e.g., since the person cannot be identified, generating what could be a potentially unnecessary notification may be preferred instead of suppressing what could be a potentially important notification). In yet another example, the alternate response may be to contact emergency services (e.g., an unresponsive person may indicate a medical emergency). Next, the method 700 may move to the step 726.

In the decision step 716, if the audio response 412 has been received, then the method 700 may move to the step 720. In the step 720, the audio analysis module 190c may perform audio analytics on the audio response 412 received. Next, in the step 722, the analyzed audio from the audio response 412 may be compared to the stored audio data that may be part of the identified people 252a-252n. In the step 724, the processor 102 may determine the identity of the person in the video frame based on the audio analytics. For example, the processor 102 may determine that the person with the face not visible in the video frame may be a particular one of the identified people 252a-252n in response to a match of the received audio 412 and the audio data stored as part of the identified people 252a-252n. Next, the method 700 may move to the step 726. The step 726 may end the method 700.

The functions performed by the diagrams of FIGS. 1-15 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
an interface configured to receive pixel data;
a memory configured to store each of (a) an identity and (b) a permission status for one or more people; and
a processor configured to
   (i) generate a plurality of video frames internal to said apparatus in response to said pixel data received from said interface,
   (ii) perform computer vision operations without communicating said video frames from said processor to detect objects in said video frames,
   (iii) extract features of said objects in response to characteristics of said objects determined using said computer vision operations,
   (iv) compare a detected person to said identity of each of said people to identify said detected person in said video frames based on said features,
   (v) detect an event based on said features; and
   (vi) communicate a notification external to said apparatus in response to (A) detecting said event if said detected person is not present in said video frames and
(B) detecting said event and said permission status corresponding to said detected person if said detected person is present in said video frames, wherein said permission status (a) suppresses sending said notification when said permission status for said detected person identified corresponds to denying said notification and (b) enables sending said notification when said permission status for said detected person does not correspond to denying said notification.

2. The apparatus according to claim 1, wherein said processor is further configured to (i) generate a video stream external to said apparatus in response to said video frames and (ii) modify said video frames in response to said permission status of said detected person before generating said video stream.

3. The apparatus according to claim 2, wherein (i) said permission status corresponding to said detected person provides an indication to deny recording said detected person and (ii) modifying said video frames comprises stopping a recording of said video stream when said detected person is present in said video frames and resuming said recording of said video stream when said detected person is not present in said video frames.

4. The apparatus according to claim 2, wherein (i) said permission status corresponding to said detected person provides an indication to obscure said detected person and (ii) modifying said video frames comprises applying a blur to a location on said video frames corresponding to said detected person.

5. The apparatus according to claim 1, wherein said processor is further configured to:
(i) generate a second plurality of video frames from second pixel data received by said interface from a video capture device,
(ii) perform said computer vision operations to detect second objects in said second video frames,
(iii) extract said features of said second objects in response to said characteristics of said second objects determined using said computer vision operations,
(iv) detect a second event based on said features, and
(v) generate said notification in response to detecting said second event.

6. The apparatus according to claim 5, wherein said permission status determined by said processor for said video frames does not suppress said notification for said second event captured by said video capture device.

7. The apparatus according to claim 5, wherein:
(i) said processor is further configured to determine said permission status in response to said detected person in said second plurality of video frames; and
(ii) said permission status determined by said processor for said second video frames does not suppress said notification for said event captured by said video frames.

8. The apparatus according to claim 1, wherein said computer vision operations comprise face recognition.

9. The apparatus according to claim 1, wherein said permission status is implemented to provide privacy protection for said detected person.

10. The apparatus according to claim 1, wherein said event comprises motion.

11. The apparatus according to claim 1, further comprising:
(i) an audio capture device and
(ii) an audio playback device, wherein said processor is further configured to
(A) generate an audio question using said audio playback device,
(B) receive an audio response from said person using said audio capture device, and
(C) identify said detected person and determine said permission status in response to said audio response.

12. The apparatus according to claim 11, wherein said audio question is generated when said computer vision operations are unable to identify said detected person.

13. The apparatus according to claim 11, wherein said audio question is (i) configured to ask for said identity of said person and (ii) selected based on a context of a behavior of said detected person determined in response to said computer vision operations.

14. The apparatus according to claim 11, wherein (i) said processor is configured to perform voice recognition on said audio response to identify said person based on recognizing speech patterns and (ii) said memory is further configured to store said speech patterns for each of said people.

15. The apparatus according to claim 11, wherein said processor is configured to:
(i) perform voice recognition on said audio response to determine an interpretation of said audio response; and
(ii) adjust said permission status in response to said interpretation of said audio response.

16. The apparatus according to claim 1, wherein (i) said computer vision operations detect said objects by performing feature extraction based on neural network weight values for each of a plurality of visual features that are associated with said objects extracted from said video frames and (ii) said neural network weight values are determined in response to an analysis of training data by said processor prior to said feature extraction.

17. The apparatus according to claim 1, wherein said computer vision operations are further performed by (i) applying a feature detection window to each of a plurality of layers extracted from said video frames and (ii) a convolution operation using matrix multiplication of portions of said plurality of layers defined by said feature detection window.

18. The apparatus according to claim 17, wherein said computer vision operations are further performed by sliding said feature detection window along each of said plurality of layers.

19. The apparatus according to claim 1, wherein said processor is further configured to perform person identification in response to monitoring a continuity of said characteristics of said objects over a sequence of said video frames to determine whether a person captured in an earlier one of said video frames is the same person as said detected person captured in a later one of said video frames.

* * * * *